United States Patent
Lee et al.

(10) Patent No.: US 12,223,334 B2
(45) Date of Patent: Feb. 11, 2025

(54) ELECTRONIC DEVICE AND METHOD OF SETTING OPERATION MODE THEREOF

(71) Applicant: SAMSUNG ELECTRONICS CO., LTD., Suwon-si (KR)

(72) Inventors: Heeran Lee, Suwon-si (KR); Injune Baek, Suwon-si (KR); Yongdeok Kim, Suwon-si (KR); Bongseok Lee, Suwon-si (KR); Namsu Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/120,163

(22) Filed: Mar. 10, 2023

(65) Prior Publication Data
US 2023/0281020 A1 Sep. 7, 2023

Related U.S. Application Data

(63) Continuation of application No. PCT/KR2023/002721, filed on Feb. 27, 2023.

(30) Foreign Application Priority Data

Mar. 2, 2022 (KR) .................. 10-2022-0027023

(51) Int. Cl.
 G06F 9/445 (2018.01)
 G06F 3/147 (2006.01)
 G06F 3/16 (2006.01)
(52) U.S. Cl.
 CPC .......... G06F 9/44505 (2013.01); *G06F 3/147* (2013.01); *G06F 3/165* (2013.01)

(58) Field of Classification Search
CPC ....... G06F 9/44505; G06F 3/147; G06F 3/165
See application file for complete search history.

(56) References Cited

U.S. PATENT DOCUMENTS

| 6,990,635 B2 | 1/2006 | Kurapati et al. |
| 8,724,028 B1 * | 5/2014 | Saijo ................ H04N 5/45 348/588 |

(Continued)

FOREIGN PATENT DOCUMENTS

| JP | 2021-157583 A | 10/2021 |
| KR | 2002-0084247 A | 11/2002 |

(Continued)

OTHER PUBLICATIONS

Kimin Lee et al., "Context-aware Dynamics Model for Generalization in Model-Based Reinforcement Learning", Proceedings of the 37th International Conference on Machine Learning, Jun. 29, 2020, (23 pages).

(Continued)

*Primary Examiner* — Faisal M Zaman
(74) *Attorney, Agent, or Firm* — Sughrue Mion, PLLC

(57) ABSTRACT

A method including identifying the operation mode of the electronic device as a first operation mode, sensing a change of setting corresponding to the first operation mode, determining whether to update setting information about the setting, based on at least one of a changing pattern or a change history of a user, and when the operation mode is identified later as the first operation mode, providing the user with the first operation mode with the plurality of updated settings including the setting information about the updated setting is provided.

18 Claims, 13 Drawing Sheets

(56) References Cited

U.S. PATENT DOCUMENTS

| | | | |
|---|---|---|---|
| 10,439,838 B2 | 10/2019 | Kim et al. | |
| 11,984,095 B1* | 5/2024 | Yong | G02F 1/133305 |
| 2004/0002982 A1* | 1/2004 | Ersek | G06F 8/658 |
| | | | 719/321 |
| 2007/0065100 A1* | 3/2007 | Matsuda | H04N 5/76 |
| | | | 386/326 |
| 2009/0037007 A1* | 2/2009 | Nishimura | G06F 3/165 |
| | | | 700/94 |
| 2010/0039566 A1 | 2/2010 | Kim et al. | |
| 2011/0199639 A1* | 8/2011 | Tani | G06F 3/04886 |
| | | | 345/173 |
| 2012/0127366 A1* | 5/2012 | Lim | H04N 21/42692 |
| | | | 348/553 |
| 2013/0219417 A1 | 8/2013 | Gilson et al. | |
| 2014/0088782 A1* | 3/2014 | Ogino | H02J 4/00 |
| | | | 700/295 |
| 2015/0195179 A1* | 7/2015 | Skare | G06F 3/0482 |
| | | | 715/779 |
| 2016/0129916 A1* | 5/2016 | Olsen | B60R 16/037 |
| | | | 701/36 |
| 2016/0352946 A1* | 12/2016 | Eguchi | G06K 15/4055 |
| 2017/0264937 A1 | 9/2017 | Jeong et al. | |
| 2018/0012113 A1* | 1/2018 | Toriyabe | G06F 3/1254 |
| 2018/0211608 A1* | 7/2018 | Reddy | G09G 3/2092 |
| 2019/0230231 A1* | 7/2019 | Ono | H04N 1/46 |
| 2019/0327526 A1 | 10/2019 | Navin et al. | |
| 2020/0013371 A1 | 1/2020 | Yang et al. | |
| 2020/0037042 A1 | 1/2020 | Colsey et al. | |
| 2020/0314985 A1* | 10/2020 | Degris | G06N 3/084 |
| 2021/0195296 A1 | 6/2021 | Aoyagi et al. | |
| 2021/0266655 A1* | 8/2021 | Patel | H04R 1/1041 |
| 2021/0306694 A1 | 9/2021 | Yoo | |
| 2022/0114136 A1* | 4/2022 | Zhu | G06F 9/4451 |
| 2022/0129282 A1 | 4/2022 | Lee et al. | |
| 2022/0239268 A1* | 7/2022 | Dhiman | H04N 21/4852 |

FOREIGN PATENT DOCUMENTS

| | | |
|---|---|---|
| KR | 10-0812042 B1 | 3/2008 |
| KR | 10-2008-0041787 A | 5/2008 |
| KR | 10-2010-0129438 A | 12/2010 |
| KR | 10-2016-0048465 A | 5/2016 |
| KR | 10-2017-0106047 A | 9/2017 |
| KR | 10-2019-0100097 A | 8/2019 |
| KR | 10-2020-0024568 A | 3/2020 |
| KR | 10-2020-0095889 A | 8/2020 |
| KR | 10-2021-0022089 A | 3/2021 |

OTHER PUBLICATIONS

International Search Report (PCT/ISA/210) and Written Opinion (PCT/ISA/237) issued by the International Searching Authority on May 31, 2023 in corresponding International Application No. PCT/KR2023/002721.

* cited by examiner

FIG. 5

| ORDER | SETTING | CHANGED RATIO |
|---|---|---|
| 1 | SCREEN MODE | 0.2 |
| 2 | SCREEN BRIGHTNESS | 0.2 |
| 3 | SOUND MODE | 0.15 |
| 4 | SHARPNESS | 0.15 |
| 5 | COLOR OF SCREEN | 0.1 |

MOVIE MODE
510

| ORDER | SETTING | CHANGED RATIO |
|---|---|---|
| 1 | SCREEN BRIGHTNESS | 0.25 |
| 2 | SHARPNESS | 0.2 |
| 3 | COLOR | 0.13 |
| 4 | CONTRAST | 0.12 |
| 5 | SCREEN MODE | 0.1 |

GAME MODE
520

| ORDER | SETTING | CHANGED RATIO |
|---|---|---|
| 1 | SOUND MODE | 0.3 |
| 2 | SCREEN BRIGHTNESS | 0.5 |
| 3 | SCREEN MODE | 0.10 |
| 4 | SOUND VOLUME | 0.08 |
| 5 | SLEEP ALARM | 0.06 |

MUSIC MODE
530

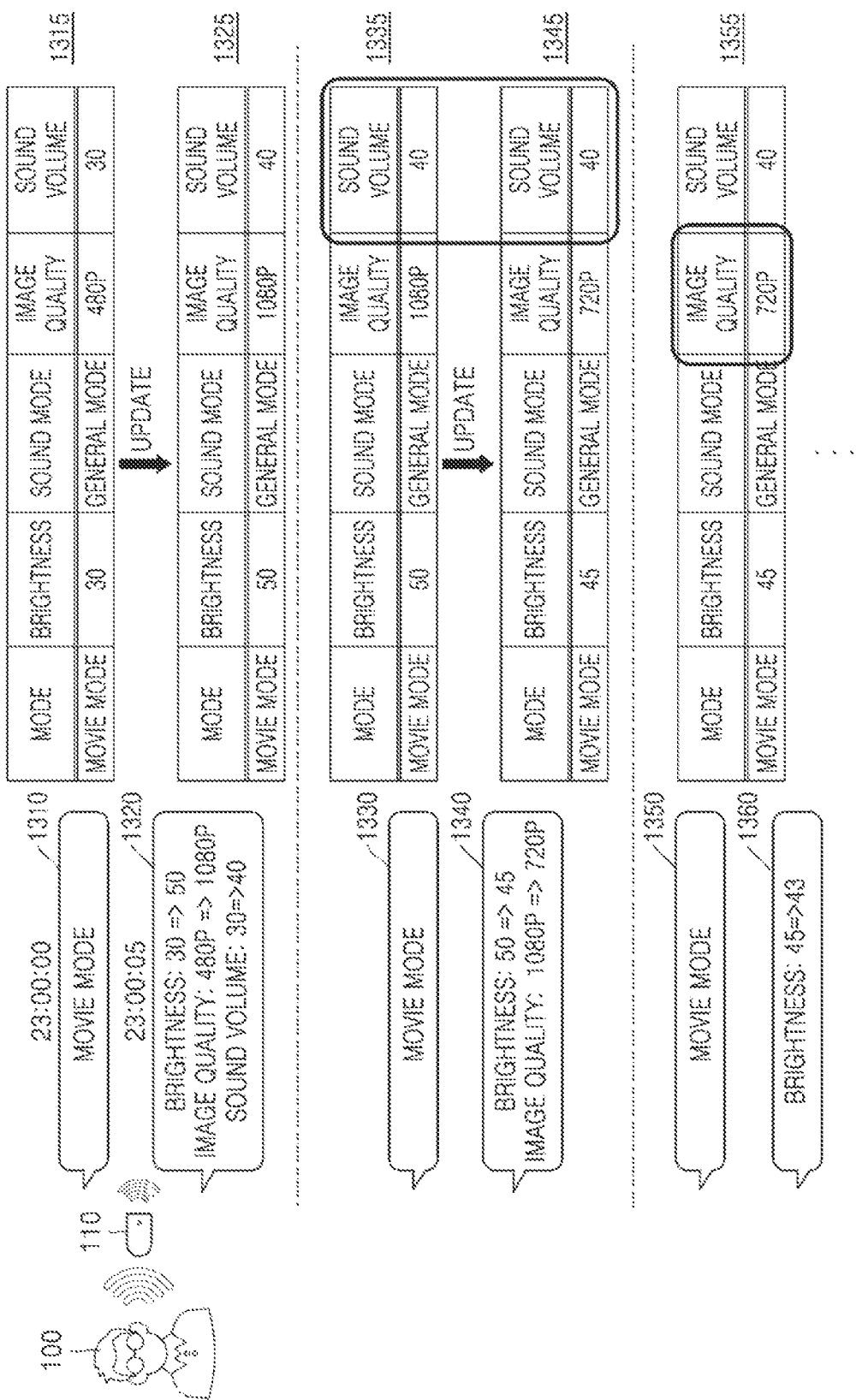

ELECTRONIC DEVICE AND METHOD OF SETTING OPERATION MODE THEREOF

CROSS-REFERENCE TO RELATED APPLICATION(S)

This application is a bypass continuation application of International Application No. PCT/KR2023/002721, filed on Feb. 27, 2023, which claims priority to Korean Patent Application No. 10-2022-0027023, filed on Mar. 2, 2022, in the Korean Intellectual Property Office, the disclosures of which are incorporated by reference herein in their entireties.

TECHNICAL FIELD

The disclosure relates to an electronic device and a method of setting and updating an operation mode thereof.

BACKGROUND ART

Due to improved performance of electronic devices, functions implemented via electronic devices have increased. A user may implement various operation modes via an application of the electronic device or an external electronic device connected to the electronic device.

When a user implements various operation modes via the electronic device, a plurality of appropriate settings including a brightness of a screen, a volume, etc., may differ for each operation mode. Therefore, a technology capable of identifying a current operation mode of an electronic device, providing a user with an operation mode having a plurality of appropriate settings, and updating the operation mode of the electronic device according to feedback from the user is required.

DESCRIPTION OF EMBODIMENTS

Technical Problem

An aspect of the disclosure provides an electronic device and a method of setting and updating an operation mode thereof, with respect to at least one first setting of which a change is sensed from among a plurality of settings corresponding to a current operation mode of the electronic device, by updating setting information about at least one first setting based on at least one of a changing pattern with respect to the at least one first setting or change history of a user with respect to the at least one first setting.

Solution to Problem

According to an aspect of the disclosure, a method of setting an operation mode of an electronic device includes identifying the operation mode of the electronic device as a first operation mode from among a plurality of operation modes of the electronic device; sensing a change of at least one first setting from among a plurality of settings corresponding to the first operation mode; based on the change of the at least one first setting, determining whether to update setting information about the at least one first setting based on at least one of a changing pattern of the at least one first setting or a change history of a user with respect to the at least one first setting; and based on the operation mode of the electronic device being identified as the first operation mode, providing the user with the first operation mode having the plurality of updated settings including the setting information about the updated at least one first setting according to the determination about the updating The method may include, based on the first operation mode being provided, sensing a change of a at least one second setting; and determining whether to update setting information about the at least one second setting, based on a reinforcement learning model about the operation mode of the electronic device.

The reinforcement learning model may be a learning model in which a reward for the at least one second setting is a negative reward, and a reward for at least one setting, from among the plurality of settings, not included in the at least one second setting is a zero reward.

The determining of whether to update the setting information about the at least one first setting may include: based on the change of the at least one first setting corresponding to the changing pattern of the at least one first setting, updating the setting information about the at least one first setting.

The changing pattern of the at least one first setting may be a pattern in which, based on the electronic device operating in the first operation mode, the at least one first setting is changed within a preset time period.

The determining of whether to update the setting information about the at least one first setting may include: based on the change of the at least one first setting and the change history of the user with respect to the at least one first setting, updating the setting information about the at least one first setting based on a number of times of changing the at least one first setting exceeding a preset value.

The identifying of the operation mode of the electronic device as the first operation mode from among the plurality of operation modes may include: identifying the operation mode of the electronic device as the first operation mode from among the plurality of operation modes, based on status information of the electronic device.

The status information may include at least one of information about the plurality of settings of the electronic device, information about an application that is being executed on the electronic device, information about content that is being played on the electronic device, or information about an external electronic device connected to the electronic device.

The identifying of the operation mode of the electronic device as the first operation mode from among the plurality of operation modes may include: identifying the operation mode of the electronic device as the first operation mode, based on an input about the operation mode of the electronic device being received from the user.

The plurality of settings may be determined based on the change history of the plurality of settings.

According to an aspect of the disclosure, an electronic device of which an operation mode is to be set includes: a memory storing one or more instructions; and at least one processor configured to execute the one or more instructions to: identify an operation mode of the electronic device as a first operation mode from among a plurality of operation modes of the electronic device; sense a change of at least one first setting from among a plurality of settings corresponding to the first operation mode; determine whether to update setting information about the at least one first setting, based on at least one of a changing pattern of the at least one first setting or a change history of a user with respect to the at least one first setting as the change in the at least one first setting is sensed; and based on the operation mode of the electronic device being identified as the first operation mode provide to the user, the first operation mode having the plurality of updated settings including the setting information about the updated at least one first setting according to a determination with respect to the updating.

The at least one processor may be further configured to, based on the first operation mode being provided, sense a change of a at least one second setting, and determine whether to update setting information about the at least one second setting, based on a reinforcement learning model about the operation mode of the electronic device.

The reinforcement learning model may be a learning model in which a reward for the at least one second setting is a negative reward and a reward for at least one setting, from among the plurality of settings, not included in the at least one second setting is a zero reward.

The at least one processor may be further configured to, based on the change of the at least one first setting corresponding to a changing pattern of the at least one first setting, update setting information about the at least one first setting.

The changing pattern of the at least one first setting may be a pattern in which, based on the electronic device operating in the first operation mode, the at least one first setting is changed within a preset time period.

The at least one processor may be further configured to, based on the number of times of changing the at least one first setting exceeding a preset value, update setting information about the at least one first setting, based on the change of the at least one first setting and a change history of the user with respect to the at least one first setting.

The at least one processor may be further configured to identify the operation mode of the electronic device as the first operation mode from among the plurality of operation modes, based on status information of the electronic device.

The status information may include at least one of information about the plurality of settings of the electronic device, information about an application that is being executed on the electronic device, information about content that is being played on the electronic device, or information about an external electronic device connected to the electronic device.

The at least one processor may be further configured to identify the operation mode of the electronic device as the first operation mode, based on an input about the operation mode of the electronic device being received from the user.

According to an aspect of the disclosure, a non-transitory computer-readable recording medium having recorded thereon a program, which when executed by a computer, performs a method including: identifying the operation mode of the electronic device as a first operation mode from among a plurality of operation modes of the electronic device; sensing a change of at least one first setting from among a plurality of settings corresponding to the first operation mode; based on the change of the at least one first setting, determining whether to update setting information about the at least one first setting based on at least one of a changing pattern of the at least one first setting or a change history of a user with respect to the at least one first setting; and based on the operation mode of the electronic device being identified as the first operation mode, providing the user with the first operation mode having the plurality of updated settings including the setting information about the updated at least one first setting according to the determination about the updating.

According to an aspect of the disclosure, an electronic device includes: a memory storing one or more instructions; and at least one processor configured to execute the one or more instructions to: sense a change of at least one first setting from among a plurality of settings corresponding to an operation mode; based on at least one of a changing pattern of the at least one first setting or a change history of a user with respect to the at least one first setting, determine to update setting information about the at least one first setting; and based on the operation mode of the electronic device being identified as a first operation mode, provide the first operation mode having the plurality of settings including the setting information about the updated at least one first setting.

The processor may be further configured to, based on sensing a change of a at least one second setting, update the change of the second setting based on a reinforcement learning model about the operation mode of the electronic device.

The changing pattern of the at least one first setting may be a pattern in which the at least one first setting is changed within a preset time period.

The at least one processor may be further configured to identify the operation mode of the electronic device based on status information of the electronic device.

Advantageous Effects of Disclosure

According to an embodiment of the disclosure, an electronic device may identify a current operation mode of the electronic device, and may sense a change of at least one of a plurality of settings corresponding to the identified current operation mode. As the change of at least one first setting is sensed, the electronic device may determine whether to update setting information about the at least one first setting based on at least one of a change pattern with respect to at least one first setting or a change history of a user with respect to the at least one first setting. Therefore, the current operation mode of the electronic device is updated based on the setting change of the user, and thus, the electronic device may provide the user with an operation mode having a plurality of set values that are optimized for the user.

BRIEF DESCRIPTION OF DRAWINGS

FIG. 5 is a diagram illustrating a plurality of settings corresponding to each of a plurality of operation modes of an electronic device, according to an embodiment of the disclosure;

FIG. 13 is a diagram illustrating an example of updating a plurality of settings in a current operation mode of an electronic device based on an enhanced learning model with respect to an operation mode of the electronic device, according to an embodiment of the disclosure.

MODE OF DISCLOSURE

Figure 1:
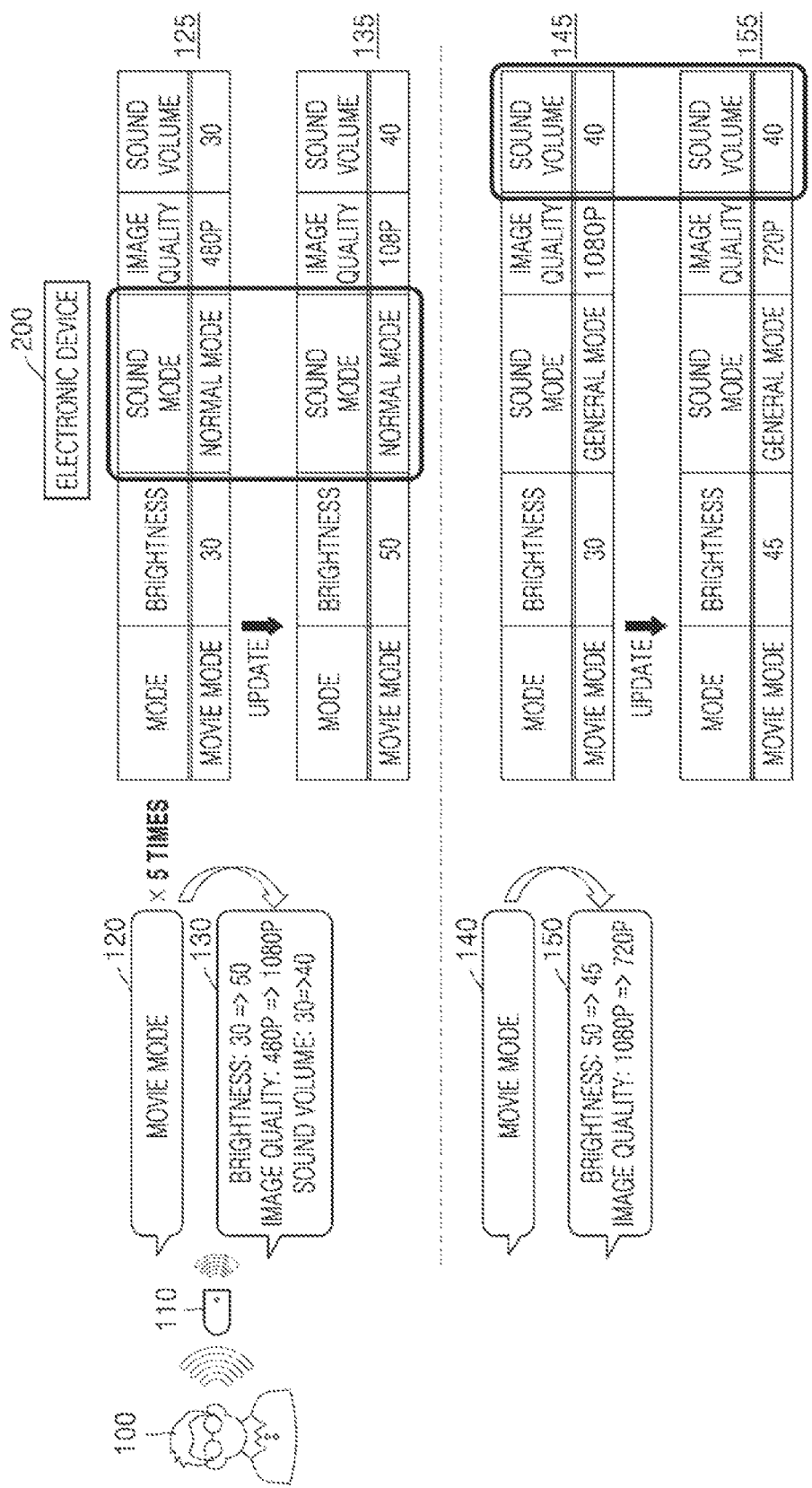
FIG. 1 is a diagram illustrating a method of setting an operation mode of an electronic device and updating the operation mode of the electronic device, according to an embodiment of the disclosure.

Throughout the disclosure, the expression "at least one of a, b or c" indicates only a, only b, only c, both a and b, both a and c, both b and c, all of a, b, and c, or any variations thereof.

The terminology used herein will be described briefly, and an embodiment of the disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description of an embodiment of the disclosure. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. The term "unit", as used herein, means a software or hardware component, such as a Field Programmable Gate Array (FPGA) or Application Specific Integrated Circuit (ASIC), which performs certain tasks. However, the term "unit" is not limited to software or hardware. A "unit" may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or may be further separated into additional components and "units".

Hereinafter, one or more embodiments of the disclosure will be described in detail with reference to accompanying drawings to the extent that one of ordinary skill in the art would be able to carry out the disclosure. However, an embodiment of the disclosure may be implemented in various ways, and is not limited to the one or more embodiments of the disclosure described herein. In addition, components irrelevant to the description are omitted in the drawings for clear description of an embodiment of the disclosure, and like reference numerals are used for similar components throughout the entire specification of the disclosure.

Throughout the specification, it will be understood that when an element is referred to as being "connected" to another element, it may be "directly connected" to the other element or "electrically connected" to the other element with intervening elements therebetween. It will be further understood that when a portion is referred to as "comprises" another component, the portion may not exclude another component but may further comprise another component unless the context states otherwise.

The disclosure will be described in detail below with reference to accompanying drawings.

FIG. 1 is a diagram illustrating a method of setting an operation mode of an electronic device and updating the operation mode of the electronic device, according to an embodiment of the disclosure.

Referring to FIG. 1, an electronic device 200 according to an embodiment of the disclosure may identify an operation mode of the electronic device 200 as a first operation mode from among a plurality of operation modes of the electronic device 200. In an embodiment of the disclosure for identifying the first operation mode, the electronic device 200 may receive an input about the operation of the electronic device 200 from a user 100. In detail, the user 100 may transmit an input about the operation of the electronic device 200 via an external electronic device, and the electronic device 200 may identify the operation mode as the first operation mode from among the plurality of operation modes of the electronic device 200 based on the received input about the operation of the electronic device 200. For example, referring to FIG. 1, the electronic device 200 may receive a movie mode 120, that is, an input from the user 100, via a remote control device 110, and the electronic device 200 may identify the current operation mode of the electronic device as the movie mode 120. Here, the operation mode of the electronic device 200 may represent a mode operating the electronic device 200 in one or more execution environments or setting states of the electronic device 200, in order to maximize an execution effect of content executed on the electronic device 200. For example, the plurality of operation modes of the electronic device 200 may include at least one of a movie mode, a music listening mode, a game mode, or a party mode, but is not limited thereto. For example, the operation mode of the electronic device 200 may be set by the user 100.

As the operation mode of the electronic device 200 according to an embodiment of the disclosure is identified as the movie mode 120, the electronic device 200 may change a plurality of settings to correspond to the movie mode 120 that is the first operation mode. Referring to FIG. 1, as the operation mode of the electronic device 200 is identified as the movie mode 120 that is the first operation mode, the electronic device 200 may change, from among a plurality of settings, brightness, sound mode, image quality, and sound volume to be suitable for the movie mode. For example, referring to FIG. 1, the electronic device 200 may change, from among the plurality of settings, the brightness to 30, the sound mode to a general mode, the image quality to 480P, and the sound volume to 30. A current operation state 125 of the electronic device 200 may correspond to, from among the plurality of settings, the brightness of 30, the sound mode of the general mode, the image quality of 480P, and the sound volume of 30. Also, the current operation state 125 of the electronic device 200 may include default values of the plurality of settings corresponding to the movie mode 120, that is, the first operation mode of the electronic device 200, but is not limited thereto.

The plurality of settings corresponding to the operation mode according to an embodiment of the disclosure may denote a plurality of settings with respect to the electronic device based on change histories of the user and other users in the corresponding operation mode. For example, referring to FIG. 1, users who use the movie mode from among the operation modes of the electronic device 200 may mainly change the brightness, the sound mode, the image quality, and the sound volume in order to watch content. Therefore, the plurality of settings corresponding to the first operation mode may include at least one of the brightness, the sound mode, the image quality, or the sound volume.

The electronic device 200 according to an embodiment of the disclosure may sense a change in at least one first setting of the plurality of settings corresponding to the movie mode 120 that is the first operation mode. Referring to FIG. 1, the electronic device 200 may sense the change 130 of at least one first setting of the plurality of settings in the movie mode 120 from the user 100. For example, the electronic device 200 may sense that the brightness, from among the plurality of settings, has changed from 30 to 50, that the image quality, from among the plurality of settings, has changed from 480P to 1080P, and that the sound volume, from among the plurality of settings, has changed from 30 to 40.

The electronic device 200 according to an embodiment of the disclosure may determine whether to update setting information about at least one first setting, according to the change 130 of at least one first setting. The electronic device 200 may change at least one first setting according to the input from the user, and at the same time, may determine whether to update the setting information about at least one first setting of the plurality of settings corresponding to the movie mode 120 that is the first operation mode later.

The electronic device 200 may determine whether to update the setting information about at least one first setting, based on at least one of a changing pattern of at least one first setting or change history of the user 100 with respect to at least one first setting. For example, referring to FIG. 1, when the number of times of changing the at least one first setting is 5 times, that is, exceeds 4 times that is a critical value set in advance, the electronic device 200 may update the setting information about the at least one first setting, of which the change is sensed. In the specification of the disclosure, the setting information may denote information indicating a set value for the setting of the electronic device or current status of the setting of the electronic device. For example, the setting information about the brightness may denote a set value, that is, the brightness of 30, and setting information about the sound mode may denote information indicating that the current sound mode is the general mode.

As the setting information about at least one first setting, the change of which is sensed, is updated, the electronic device 200 may update the first operation mode. In detail, a first operation mode 135 that is updated may correspond to, from among the plurality of settings, the brightness of 50, the sound mode of the general mode, the image quality of 1080P, and the sound volume of 40. Therefore, the electronic device 200 may generate the updated first operation mode 135 having a plurality of settings that are more suitable for the user 100, based on at least one of a changing pattern of at least one first setting or the change history of the user 100 with respect to at least one first setting.

The electronic device 200 according to an embodiment of the disclosure may receive an input about the operation of the electronic device 200 from the user, after a certain period of time has passed since the update of at least one first setting. Referring to FIG. 1, the electronic device 200 may receive a movie mode 140, that is, an input from the user 100, via a remote control device 110, and the electronic device 200 may identify the current operation mode of the electronic device as the movie mode 140. As the operation mode of the electronic device 200 is identified as the movie mode 140, the plurality of settings may be changed to correspond to the movie mode 140 that is the first operation mode. In detail, by reflecting the update of at least one first setting, the updated operation state 145 of the electronic device 200 may correspond to the brightness of 40, the sound mode of the general mode, the image quality of 1080P, and the sound volume of 40, from among the plurality of settings.

The electronic device 200 according to an embodiment of the disclosure may sense a change in at least one second setting from among the plurality of settings corresponding to the movie mode 140 that is the first operation mode. Referring to FIG. 1, the electronic device 200 may sense a change 150 of the at least one second setting from among the plurality of settings in the movie mode 140 from the user 100. For example, the electronic device 200 may sense that, from among the plurality of settings, the brightness has changed from 50 to 45, and that the image quality has changed from 1080P to 720P.

The electronic device 200 according to an embodiment of the disclosure may train a reinforcement learning model for updating the operation mode of the electronic device 200 from the change 150 of the at least one second setting, that is, the feedback from the user 100. Even though the first operation mode is updated, the change 150 of the at least one second setting that is changed by the user 100 may be the setting that is not suitable for the user. On the contrary, the setting that is not additionally changed by the user 100 may be the setting that has changed to be suitable for the user 100. Therefore, a reward for the brightness and the image quality included in the at least one second setting from among the plurality of settings may be a negative reward. From among the plurality of settings, a reward for the sound volume that is not included in the at least one second setting may be a positive reward. In detail, a re-updated first operation mode 155 may correspond to, from among the plurality of settings, the brightness of 45, the sound mode of the general mode, the image quality of 720P, and the sound volume of 40. Therefore, according to the setting change from the user 100, the positive reward or the negative reward is rewarded to train the reinforcement learning model, and thus, the electronic device 200 may provide the user with a customized operation mode.

Figure 2:
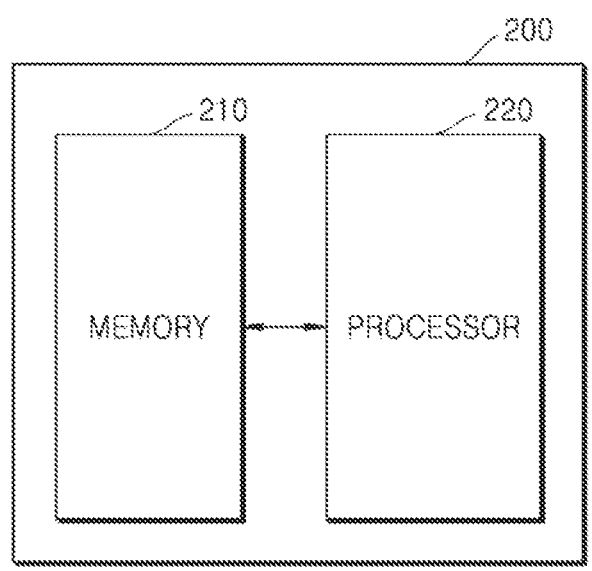
FIG. 2 is a block diagram of an electronic device for setting an operation mode of the electronic device, according to an embodiment of the disclosure.

FIG. 2 is a block diagram of an electronic device for setting an operation mode of the electronic device, according to an embodiment of the disclosure.

The electronic device 200 according to an embodiment of the disclosure is an electronic device for setting an operation mode of the electronic device 200, and in particular, an electronic device for setting the operation mode of the electronic device and updating the operation mode of the electronic device. The electronic device 200 according to an embodiment of the disclosure may include a memory 210 and a processor 220. Hereinafter, the elements will be described below.

The memory 210 may store programs for processing and controlling the processor 220. The memory 210 according to an embodiment of the disclosure may store one or more instructions.

The processor 220 may control overall operations of the electronic device 200, and may execute one or more instructions stored in the memory 210 to control the operations of the electronic device 200. The processor 220 may include at least one processor for executing at least one instruction stored in the memory 210.

The processor 220 according to an embodiment of the disclosure identifies the operation mode of the electronic device as the first operation mode from among the plurality of operation modes of the electronic device, senses the change in at least one of the plurality of settings corresponding to the first operation mode, determines whether to update the setting information with respect to the at least one first setting based on at least one of the changing pattern of the at least one first setting or the change history of the user with respect to the at least one first setting as the change in the at least one first setting is sensed, and when the operation mode of the electronic device is identified as the first operation mode, may control the first operation mode to be provided to the user with the plurality of updated settings including the setting information about the updated at least one first setting according to the determination with respect to the update.

When the electronic device 200 provides the user 100 with the first operation mode, the processor 220 according to an embodiment of the disclosure senses the change in the at least one second setting from among the plurality of settings updated by the user, and may determine whether to update the setting information with respect to the at least one second setting based on the reinforcement learning model about the operation mode of the electronic device.

The processor 220 according to an embodiment of the disclosure may update the setting information about the at least one first setting, when the change of at least one first setting corresponds to the changing pattern with respect to the at least one first setting.

The processor 220 according to an embodiment of the disclosure may update the setting information about the at least one first setting, when the number of times of changing the at least one first setting exceeds a critical value set in advance based on the change of at least one first setting and the change history of the user about the at least one first setting.

The processor 220 according to an embodiment of the disclosure may identify the operation mode of the electronic device as the first operation mode from among the plurality of operation modes, based on the status information of the electronic device 200.

The processor 220 according to an embodiment of the disclosure may determine the operation mode of the electronic device as the first operation mode based on the input from the user about the operation of the electronic device 200.

However, not all the elements in FIG. 2 are essential elements. The electronic device 200 may be embodied with more elements than the shown elements or may be embodied with fewer elements than the shown elements. For example, as shown in FIG. 3, the electronic device 200 according to an embodiment of the disclosure may include the memory 210, the processor 220, a receiver 230, an output unit 240, a communicator 250, a user input unit 260, and an external device interface unit 270.

Figure 3:
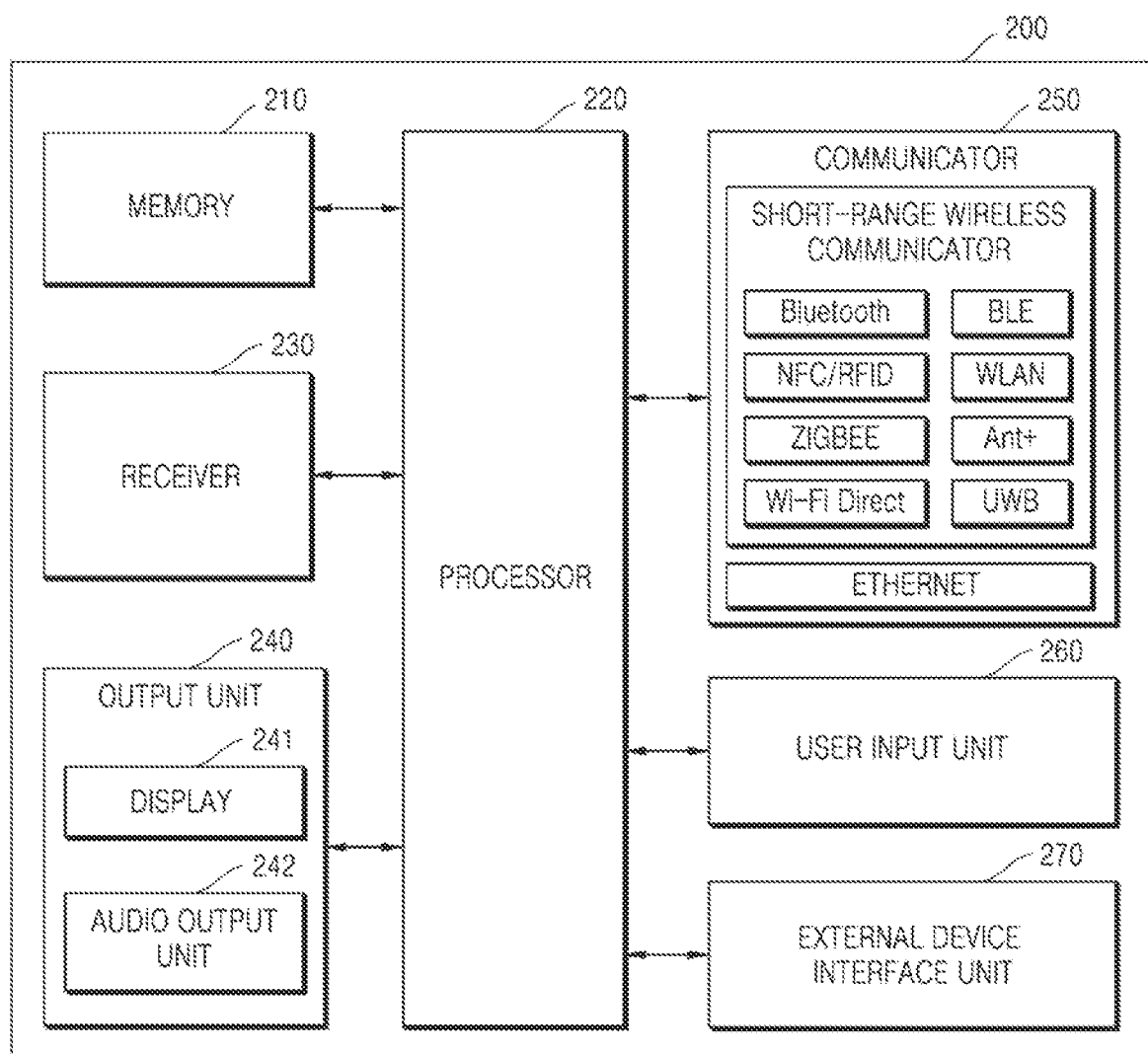
FIG. 3 is a block diagram of an electronic device for setting an operation mode of the electronic device, according to an embodiment of the disclosure.

FIG. 3 is a block diagram of an electronic device for setting an operation mode of the electronic device, according to an embodiment of the disclosure.

The electronic device 200 according to an embodiment of the disclosure is an electronic device for setting an operation mode of the electronic device 200, and in particular, an electronic device for setting the operation mode of the electronic device and updating the operation mode of the electronic device. The electronic device may include various types of devices that the user may use, such as a mobile phone, a tablet PC, a personal digital assistant (PDA), an MP3 player, a kiosk, an electronic frame, a navigation device, a digital TV, a wearable device such as a wrist watch or a head-mounted display (HMD), etc. Also, the electronic device 200 may further include the receiver 230, the output unit 240, the communicator 250, the user input unit 260, the external device interface unit 270, and a power supplier, in addition to the memory 210 and the processor 220. Hereinafter, the elements will be described below.

The memory 210 may store programs for processing and controlling the processor 220. The memory 210 according to an embodiment of the disclosure may store one or more instructions. The memory 210 may include at least one of an internal memory or an external memory.

The memory 210 may store various programs and data used for operating the electronic device 200. For example, the memory 210 may store programs and data for updating the operation mode of the electronic device 200. The memory 210 may store a list of the plurality of operation modes of the electronic device 200, and may store a plurality of settings corresponding to each of the plurality of operation modes. The memory 210 may store the changing pattern of the plurality of settings and the change history of the user with respect to the plurality of settings, which are used to update the operation mode of the electronic device 200. The memory 210 may include information about an application that is being executed on the electronic device 200 and information about content that is being played on the electronic device 200. The electronic device 200 may store the reinforcement learning model with respect to the operation mode of the electronic device 200. Also, the list of the plurality of operation modes, the plurality of settings corresponding to each of the plurality of operation modes, the changing pattern with respect to the plurality of settings, and the change history of the user with respect to the plurality of settings may be stored in a server connected to the electronic device 200, but the disclosure is not limited thereto.

The internal memory may include, for example, at least one of a volatile memory (e.g., dynamic random-access memory (DRAM), static RAM (SRAM), synchronous DRAM (SDRAM), etc.), a non-volatile memory (e.g., one time programmable read only memory (OTPROM), programmable ROM (PROM), erasable and programmable ROM (EPROM), electrically erasable and programmable ROM (EEPROM), mask ROM, flash ROM, etc.), hard disk drive (HDD), or a solid state drive (SSD). According to an embodiment of the disclosure, the processor 220 may load and process a command or data received from at least one of the non-volatile memory or another element onto volatile memory. Also, the processor 220 may store the data received from or generated by another element in the non-volatile memory.

The external memory may include, for example, at least one of compact flash (CF), secure digital (SD), micro-SD, mini-SD, extreme digital (xD), or a memory stick.

The processor 220 may include at least one of RAM, ROM, central processing unit (CPU), graphic processing unit (GPU), or bus. The RAM, ROM, CPU, GPU, etc., may be connected to one another via a bus. According to an embodiment of the disclosure, the processor 220 may include an artificial intelligence (AI) processor for generating the reinforcement learning model with respect to the operation mode, but is not limited thereto. According to an embodiment of the disclosure, the AI processor may be implemented as a separate chip from the processor 220. According to an embodiment of the disclosure, the AI processor may include a universal chip.

The processor 220 according to an embodiment of the disclosure identifies the operation mode of the electronic device as the first operation mode from among the plurality of operation modes of the electronic device, senses the change in at least one of the plurality of settings corresponding to the first operation mode, determines whether to update the setting information with respect to the at least one first setting based on at least one of the changing pattern of the at least one first setting or the change history of the user with respect to the at least one first setting as the change in the at least one first setting is sensed, and when the operation mode of the electronic device is identified as the first operation mode, may control the first operation mode to be provided to the user with the plurality of updated settings including the setting information about the updated at least one first setting according to the determination with respect to the update. However, each of the operations executed by the processor 220 may be executed via an additional server. For example, the server may determine whether to update the setting information about at least one first setting, based on at least one of a changing pattern of at least one first setting or change history of the user with respect to at least one first setting.

The receiver 230 may include a microphone that is built in the electronic device 200 or provided on outside, and the receiver 230 may include one or more microphones. In detail, the processor 220 may receive an input about the operation mode of the electronic device 200 via the receiver 230. Analog voice received by the electronic device 200 via the receiver 230 may be digitized and transmitted to the processor 220 of the electronic device 200. A voice signal may be a signal that is received and recognized through a separate external electronic device including a microphone or a portable terminal including the microphone. In this case, the electronic device 200 may not include the receiver 230. In detail, the analog voice received through the external electronic device or the portable terminal may be digitized and may be received by the electronic device 200 via data transmission communication such as Bluetooth or Wi-Fi.

The output unit 240 may output audio or video, and in more detail, the output unit 240 may include at least one of a display 241 or an audio output unit 242.

The display 241 may include a display panel and a controller controlling the display panel, and the display 241 may denote a display embedded in the electronic device 200. The display panel may include various types of displays such as liquid crystal display (LCD), organic light-emitting diode (OLED), active-matrix organic light-emitting diode (AM-OLED), plasma display panel (PDP), etc., The display panel may be configured to be, for example, flexible, transparent, or wearable. The display 241 may be provided as a touch screen in combination with a touch panel of the user input unit 260. For example, the touch screen may include an integrated type module in which a display panel and a touch panel are coupled to each other in a stack structure. The display 241 according to an embodiment of the disclosure may output a user interface (UI) relating to the plurality of settings in the operation mode according to the current operation of the electronic device 200, according to a control by the processor 220.

The audio output unit 242 may include at least one speaker. The audio output unit 242 may output an audio signal in a sound mode and a sound volume corresponding to the operation mode, according to the control by the processor 220. For example, referring to FIG. 1, the electronic device 200 may set the sound mode as the general mode and set the sound volume to be 30 according to the current operation state 125, and thus, the audio signal is adjusted to correspond to the current operation state 125 and may be output through the audio output unit 242.

The communicator 250 may include one or more elements allowing the electronic device 200 and a plurality of devices located around the electronic device 200 to communicate with each other. The communicator 250 may include one or more elements allowing the electronic device 200 and the server to communicate with each other. In detail, the communicator 250 may perform communication with various types of external devices or the server according to various types of communication types. Also, the communicator 250 may include a short-range wireless communicator.

The short-range wireless communicator may include, but is not limited to, a Bluetooth communicator, a Bluetooth low energy (BLE) communicator, a near field communication unit, a WLAN (Wi-Fi) communicator, a ZigBee communicator, an infrared-ray data association (IrDA) communicator, a Wi-Fi direct (WFD) communicator, an ultra wideband (UWB) communicator, an Ant+ communicator, Ethernet communicator, etc.

In detail, when each operation executed in the processor 220 is performed in the server, the electronic device 200 may be connected to the server via the Wi-Fi module or Ethernet module of the communicator 250, but is not limited thereto. Here, the server may denote a cloud-based server. Also, the electronic device 200 may be connected to an external electronic device receiving a voice signal via the Bluetooth communicator or Wi-Fi communicator of the communicator 250, but is not limited thereto. For example, the electronic device 200 may be connected to an external electronic device receiving the voice signal via at least one of the Wi-Fi module or Ethernet module of the communicator 250.

The user input unit 260 may denote a unit which receives an input of various commands from the user and through which the user inputs data for controlling the electronic device 200. The user input unit 260 may include, but is not limited to, at least one from a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch. The key may include various types of keys such as a mechanical button, a wheel, etc., formed on various regions such as a front portion, side portion, rear portion, etc., on the exterior of the electronic device 200 main body. The touch panel senses a touch input of the user and outputs a touch event value corresponding to the sensed touch signal. When the touch panel is combined with the display panel as a touch screen, the touch screen may be implemented as various types of touch sensors such as a capacitive type, a resistive type, a piezoelectric type, etc. The electronic device 200 according to an embodiment of the disclosure may obtain an input about the operation of the electronic device via the user input unit 260. A critical value according to an embodiment of the disclosure may be adaptively adjusted via the user input unit 260, but is not limited thereto.

The external device interface unit 270 provides an interface environment between the electronic device 200 and various external devices. The external device interface unit 270 may include an NV input/output unit. The external device interface unit 270 may be connected with an external device such as a Digital Versatile Disk (DVD), a Blu-ray, a gaming device, a camera, a computer, an air-conditioner, a laptop computer, a desktop computer, a television, a digital display device, etc. in wired/wireless manner. The external device interface unit 270 may transfer image, video, and audio signals input through the external device connected thereto to the processor 220 of the electronic device 200. The processor 220 may control a processed data signal such as a two-dimensional (2D) image, a three-dimensional (3D) image, video, audio, etc., to be output to the external device. The NV input/output unit may include a universal serial bus (USB) terminal, a composite video banking sync (CVBS) terminal, a component terminal, an S-video terminal (analog), a digital visual interface (DVI) terminal, a high-definition multimedia interface (HDMI) terminal, a display port (DP), thunderbolt, a red/green/blue (RGB) terminal, a D-SUB terminal, etc., to input an image signal and an audio signal of the external device to the electronic device 200. The electronic device 200 according to an embodiment of the disclosure may be connected to an external electronic device used in using the operation mode such as a game mode, a music mode, a movie mode, etc., via the interface such as the HDMI terminal of the external device interface unit 270. The electronic device 200 according to an embodiment of the disclosure may obtain information about the external electronic device connected to the electronic device via the external device interface unit 270.

The electronic device 200 may further include the power supplier. The power supplier may supply power to the elements of the electronic device 200 according to the control by the processor 220. The power supplier may supply the electric power input from an external power source via a power cord to each element in the electronic device 200 according to the control by the processor 220.

Figure 4:
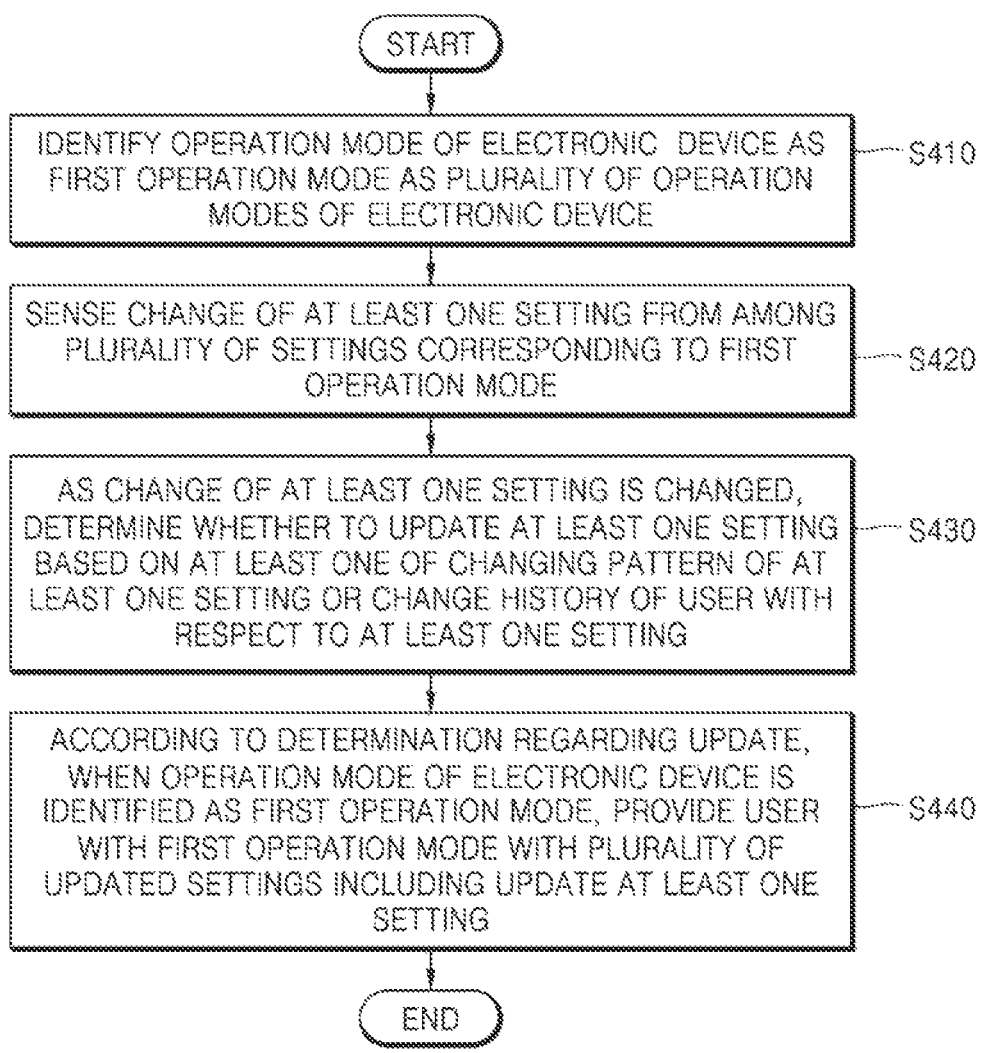
FIG. 4 is a flowchart illustrating an operation mode of an electronic device, according to an embodiment of the disclosure.

FIG. 4 is a flowchart illustrating an operation mode of an electronic device according to an embodiment of the disclosure.

In operation S410, the electronic device according to an embodiment of the disclosure may identify the operation mode of the electronic device as the first operation mode from among a plurality of operation modes of the electronic device.

The electronic device 200 according to an embodiment of the disclosure may identify an operation mode of the electronic device 200 as a first operation mode from among a plurality of operation modes of the electronic device 200. The plurality of operation modes of the electronic device 200 may include at least one of a movie mode, a music listening mode, a game mode, a party mode, a wake-up mode, or a sleep mode, but is not limited thereto. For example, the user may set a personalized operation mode via the user input unit 260.

In an embodiment of the disclosure in which the operation of the electronic device is identified as the first operation mode from among the plurality of operation modes of the electronic device, the electronic device 200 may identify the operation mode of the electronic device 200 as the first operation mode based on at least one of status information of the electronic device 200 or an input of the user about the operation of the electronic device 200.

For example, the electronic device 200 may identify the operation mode of the electronic device 200 as the first operation mode from among the plurality of operation modes, based on the status information of the electronic device 200. The status information of the electronic device 200 may include at least one of information about the current plurality of settings of the electronic device 200, information about an application that is being executed on the electronic device 200, information about content that is being played on the electronic device 200, and information about the external electronic device connected to the electronic device 200. For example, the information about the application that is being currently executed may include information representing that the currently executed application is related to an over-the-top (OTT) media service. Also, the information about the plurality of settings of the electronic device 200 may include information representing that the sound mode is a stereo mode. Here, the electronic device 200 may identify the current operation mode as the movie mode from among the plurality of operation modes, based on the information about the currently executed application and the sound mode.

The electronic device 200 may obtain information about the external electronic device connected via the external device interface unit 270, and may identify the operation mode of the electronic device 200 as the first operation mode from among the plurality of operation modes based on the obtained information about the external electronic device. For example, the electronic device 200 may be connected to the external electronic device that is a game device via the HDMI, and the application or program that is being currently executed on the electronic device 200 may be one about games. Here, the electronic device 200 may identify the first operation mode, from among the plurality of operation modes, as the game mode.

Also, the electronic device 200 according to an embodiment of the disclosure may identify the operation mode of the electronic device as the first operation mode, based on an input from the user about the operation of the electronic device 200. For example, the electronic device 200 may receive an input from the user about the operation of the electronic device 200 via the user input unit 260, and may identify the first operation mode corresponding to the received input about the operation of the electronic device 200. Also, the electronic device 200 may receive the input from the user about the operation of the electronic device 200 via the receiver 230 or the communicator 250 and may identify the first operation mode corresponding to the received input about the operation of the electronic device 200, but is not limited thereto.

In operation S420, the electronic device according to an embodiment of the disclosure may sense a change of at least one first setting from among the plurality of settings corresponding to the first operation mode.

The electronic device 200 may sense whether all the plurality of settings have changed in the electronic device 200. The electronic device 200 may sense whether the plurality of settings corresponding to the first operation mode have changed, in order to effectively sense the setting change. Here, the plurality of settings corresponding to the plurality of operation modes of the electronic device 200 may be determined based on the change history of the plurality of settings. The change history of the plurality of settings may include change histories of the user and the other users.

The electronic device 200 according to an embodiment of the disclosure may sense the change of at least one first setting from among the plurality of settings corresponding to the first operation mode. The user may change at least one first setting via the user input unit 260, and the electronic device 200 may sense the at least one first setting that has changed. Also, the electronic device 200 may receive an input of the user about the change in at least one first setting via the communicator 250 and may sense the at least one first setting that is changed.

In operation S430, when the change of at least one first setting is sensed, the electronic device according to an embodiment of the disclosure may determine whether to update the setting information about the at least one first setting based on at least one of the changing pattern of the at least one first setting or the change history of the user with respect to the at least one first setting.

When the change of at least one first setting is sensed, the electronic device 200 according to an embodiment of the disclosure may determine whether to update the setting information about the at least one first setting when the change of the at least one first setting corresponds to the changing pattern about the at least one first setting. When the electronic device 200 operates in the first operation mode, changes tend to be concentrated on the plurality of settings related to the first operation mode within a preset time period. Therefore, the changing pattern according to the disclosure may include a pattern in which the plurality of settings are changed within a preset period of time when the electronic device 200 operates in the first operation mode, but is not limited thereto. For example, the changing pattern of the disclosure may include a pattern in which the plurality of settings are changed at a certain time or with a certain interval when the electronic device 200 operates in the first operation mode. Because the electronic device 200 determines whether to update the setting information about the at least one first setting in consideration of the changing pattern about the at least one first setting, the electronic device 200 may identify whether the change of the at least one first setting is temporary or a change for correcting detailed settings in the first operation mode.

The electronic device 200 according to an embodiment of the disclosure may update the setting information about the at least one first setting, when the number of times of changing the at least one first setting exceeds a critical value set in advance based on the change of at least one first setting and the change history of the user about the at least one first setting. When the user repeatedly corrects at least one first setting, the electronic device 200 may identify that the change in the at least one first setting is a change for correcting the detailed setting of the first operation mode. Therefore, the electronic device 200 may update the setting information about the at least one first setting, when the number of times of changing the at least one first setting exceeds a critical value set in advance based on the change of at least one first setting and the change history of the user about the at least one first setting. For example, referring to FIG. 1, when the number of times of changing the at least one first setting (the at least one first setting may include brightness, image quality, and sound volume) exceeds four times that is the critical value set in advance, the electronic device 200 may update setting information about the at least one first setting and generate updated first operation mode 135.

In operation S440, according to the determination about the update, the electronic device according to an embodiment of the disclosure may provide the user with the first operation mode with the plurality of updated settings including the setting information about the updated at least one first setting, when the operation of the electronic device is identified as the first operation mode later.

According to the determination about the update, the electronic device 200 according to an embodiment of the disclosure may provide the user with the first operation mode with the plurality of updated settings including the setting information about the updated at least one first setting, when the operation of the electronic device is identified as the first operation mode later. Therefore, the electronic device 200 may provide the user with customized first operation mode by updating the plurality of settings. However, even though the customized first operation mode is provided to the user, the first operation mode needs to be re-updated when the user corrects some of the plurality of settings corresponding to the first operation mode.

As the electronic device 200 according to an embodiment of the disclosure provides the first operation mode, the electronic device 200 may sense a change in at least one second setting from among the plurality of settings updated by the user. When the change of the at least one second setting is sensed, the electronic device 200 may determine whether to update the setting information about the at least one second setting, based on the reinforcement learning model about the operation mode of the electronic device 200. Operations of determining whether to update the setting information about the at least one second setting, based on the reinforcement learning model about the operation mode of the electronic device 200 will be described in detail later with reference to FIGS. 11 to 14.

FIG. 5 is a diagram illustrating a plurality of setting corresponding respectively to a plurality of operation modes of an electronic device according to an embodiment of the disclosure.

Referring to FIG. 5, an example of the plurality of settings corresponding to each of the plurality of operation modes of the electronic device is shown. The plurality of settings of the electronic device may be determined based on the change history of each of the plurality of settings. For example, referring to FIG. 5, the plurality of operation modes may include at least one of a movie mode 510, a game mode 520, or a music mode 530.

For example, from among the plurality of operation modes of the electronic device, the plurality of settings of the movie mode 510 may be determined based on the change history in the movie mode. For example, referring to FIG. 5, the change history of the movie mode may include information indicating that users of the movie mode mainly change a screen mode, the brightness of the screen, the sound mode, sharpness of the screen, color of the screen, etc., of the electronic device 200. In detail, the electronic device 200 may obtain the change history of a plurality of users with respect to the screen mode, the screen brightness, the sound mode, the screen sharpness, the color of the screen, etc., but is not limited thereto.

The plurality of settings corresponding to the movie mode 510 of the electronic device may include at least one of the screen mode, the screen brightness, the sound mode, the screen sharpness, or the color of the screen. The electronic device 200 according to an embodiment of the disclosure may sense whether there is a change in at least one of the screen mode, the screen brightness, the sound mode, the screen sharpness, or the color of the screen, when the operation mode of the electronic device 200 is identified as the movie mode 510.

From among the plurality of operation modes of the electronic device, the plurality of settings of the game mode 520 may be determined based on the change history in the game mode 520. For example, referring to FIG. 5, the change history in the movie mode may include information indicating that the users using the movie mode mainly change the screen brightness, the sharpness, the color, contrast, the screen mode, etc. Also, the electronic device 200 may obtain the change history of the plurality of users with respect to the screen brightness, the sharpness, the color, the contrast, the screen mode, etc., from a server, but is not limited thereto.

The plurality of settings corresponding to the game mode 520 of the electronic device may include at least one of the screen brightness, the sharpness, the color, the contrast, or the screen mode. When the operation mode of the electronic device 200 is identified as the game mode 520, the electronic device 200 according to an embodiment of the disclosure may sense whether there is a change in at least one of the screen brightness, the sharpness, the color, the contrast, or the screen mode.

The plurality of settings in the music mode 530, from among the plurality of operation modes of the electronic device, may be determined based on the change history in the music mode 530. For example, referring to FIG. 5, the change history of the music mode may include information indicating that users of the music mode mainly change the sound mode, brightness of the screen, the screen mode, sound volume, sleep alarm, etc., of the electronic device 200. Also, the electronic device 200 may obtain the change history of the plurality of users with respect to the sound mode, the screen brightness, the screen mode, the sound volume, the sleep alarm, etc., but is not limited thereto.

The plurality of settings corresponding to the music mode 530 of the electronic device may include at least one of the sound mode, the screen brightness, the screen mode, the sound volume, or the sleep alarm. When the operation mode of the electronic device 200 is identified as the music mode 530, the electronic device 200 according to an embodiment of the disclosure may sense whether there is a change in at least one of the sound mode, the screen brightness, the screen mode, the sound volume, or the sleep alarm.

Figure 6:
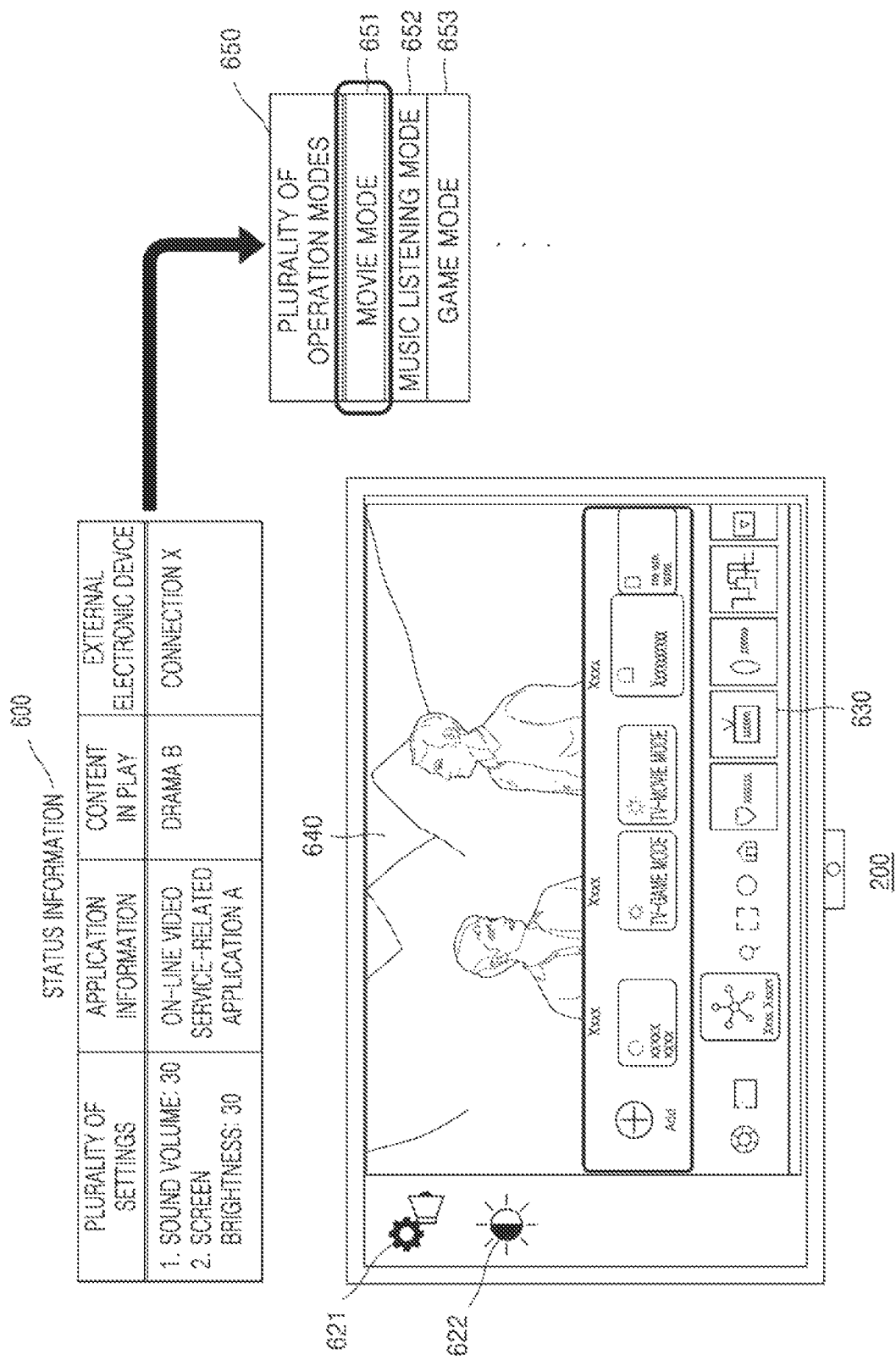
FIG. 6 is a diagram illustrating a method of identifying an operation mode of an electronic device, from among a plurality of operation modes, based on status information of the electronic device, according to an embodiment of the disclosure.

FIG. 6 is a diagram illustrating a method of identifying an operation mode of an electronic device, from among a plurality of operation modes, based on status information of the electronic device, according to an embodiment of the disclosure.

In an embodiment of the disclosure for identifying the operation mode of the electronic device as the first operation mode from among the plurality of operation modes of the electronic device, the electronic device 200 according to an embodiment of the disclosure may identify the operation mode of the electronic device 200 as the first operation mode from among the plurality of operation modes based on status information 600 of the electronic device 200. In the disclosure, the status information may include information about the operating state of the electronic device 200, and the status information may include at least one of information about the plurality of settings of the electronic device 200, information about an application being executed on the electronic device 200, information about content being played on the electronic device 200, or information about the external electronic device connected to the electronic device 200. Referring to FIG. 6, the operation mode of the electronic device 200 may be identified as a movie mode 651 from among a plurality of operation modes 650, based on the status information 600 of the electronic device 200.

Referring to FIG. 6, in the status information 600 of the electronic device 200 according to an embodiment of the disclosure, the information about the plurality of settings may include information about the sound volume and the screen brightness. For example, the information about the plurality of settings may include information indicating that the sound volume is 30 and the screen brightness is 30. The information indicating that the sound volume is 30 and the screen brightness is 30 may be output as a sound icon 621 and a brightness icon 622 via the display 241 of the electronic device 200. In the status information 600 of the electronic device 200 according to an embodiment of the disclosure, the information about the application that is being executed on the electronic device 200 may include information indicating that an application A 630 that is related to an on-line video providing service is being executed. In detail, the electronic device 200 may currently play the application A 630 via the display 241, from among the plurality of applications installed on the electronic device 200.

In the status information 600 of the electronic device 200 according to an embodiment of the disclosure, the information about the content that is being played on the electronic device 200 may include information indicating that a drama B 640 is being played on the electronic device 200. For example, the electronic device 200 may play the drama B 640 on the display 241 of the electronic device 200. Also, in the status information 600 of the electronic device 200 according to an embodiment of the disclosure, the information about the external electronic device connected to the electronic device 200 may include information indicating that an additional external electronic device is not connected thereto.

The electronic device 200 according to an embodiment of the disclosure may identify the operation mode of the electronic device 200 as the first operation mode from among the plurality of operation modes, based on the status information of the electronic device 200. For example, referring to FIG. 6, the electronic device 200 may identify the movie mode 651 that is the first operation mode from among the plurality of operation modes 650, based on a combination of the information indicating that the sound volume is 30 and the screen brightness is 30, the information indicating that the application A regarding the on-line video providing service is being executed, the information indicating that the drama B is being played, and the information indicating that the external electronic device is not connected. In detail, the electronic device 200 may identify that the current operation mode of the electronic device 200 is the movie mode 651, not a music listening mode 652 and a gate mode 653, based on that the external electronic device related to the games is not connected to the electronic device 200, the application A related to the on-line video providing service is being executed on the electronic device 200, and the drama B is being played.

Figure 7:
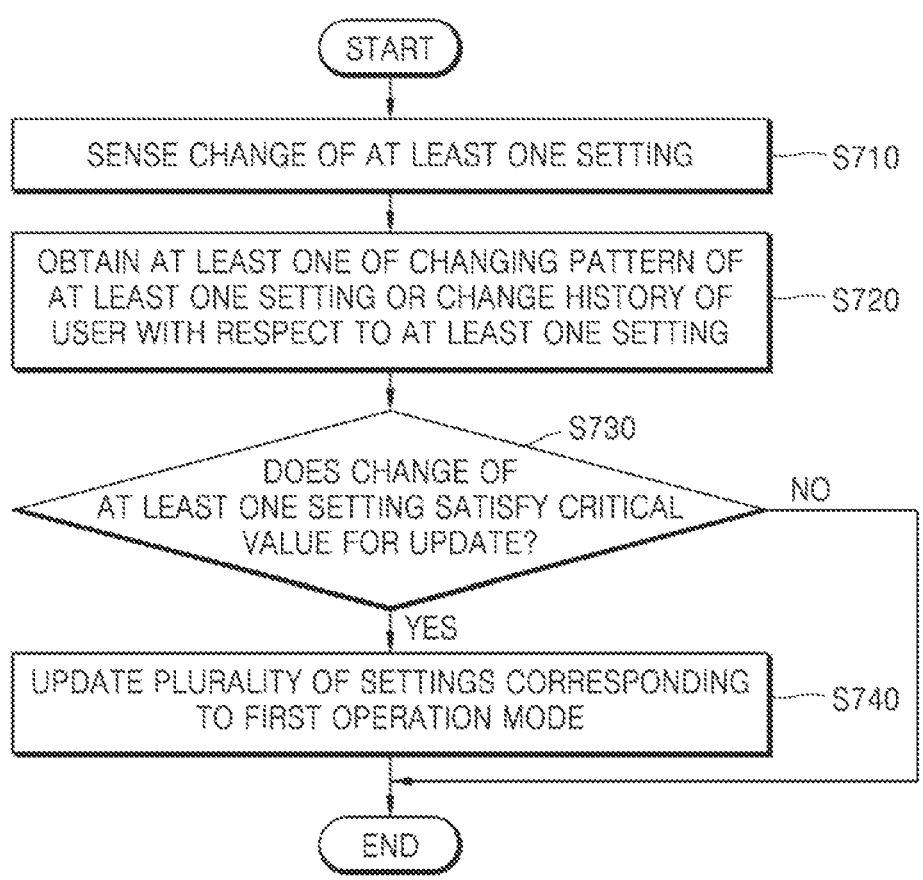
FIG. 7 is a flowchart for determining whether to update setting information with respect to at least one first setting, based on at least one of a changing pattern with respect to at least one first setting or change history of a user with respect to at least one first setting, according to an embodiment of the disclosure.

FIG. 7 is a flowchart for determining whether to update setting information with respect to at least one first setting, based on at least one of a changing pattern with respect to at least one first setting or change history of a user with respect to at least one first setting according to an embodiment of the disclosure.

In operation S710, the electronic device according to an embodiment of the disclosure may sense a change in at least one first setting from among the plurality of settings corresponding to the first operation mode of the electronic device.

The electronic device 200 according to an embodiment of the disclosure may sense the change in the at least one first setting, by obtaining information about the change of at least one first setting from among the plurality of settings corresponding to the first operation mode. The user may change at least one first setting via the user input unit 260, and the electronic device 200 may sense the at least one first setting that has changed. Accordingly, the electronic device 200 may receive an input of the user about the change in at least one first setting via the communicator 250 and may sense the changed at least one first setting, but is not limited thereto.

In operation S720, the electronic device 200 according to an embodiment of the disclosure may obtain at least one of the changing pattern of the at least one first setting or the user's change history with respect to the at least one first setting.

The changing pattern of the at least one first setting according to an embodiment of the disclosure may be obtained from the changing patterns of the plurality of users using the first operation mode, including the user of the electronic device 200. For example, the changing pattern of the at least one first setting may denote that, when the electronic device 200 operates in the first operation mode, the at least one first setting is changed within a preset time period stored in the memory 210. For example, changes of the at least one first setting by the users are mostly concentrated within 10 minutes after the operation of the electronic device 200 in the first operation mode, the preset time period stored in the memory 210 may be 10 minutes. The changing pattern of the disclosure may include a pattern in which the plurality of settings are changed at a certain time or with a certain interval when the electronic device 200 operates in the first operation mode. For example, when the at least one first setting is a setting about the wake-up alarm, the changing pattern of the at least one first setting may denote a pattern changed at about 10 pm that is an average sleep time of users and about 7 am that is an average wake-up time of the users.

The change history of the user with respect to the at least one first setting according to an embodiment of the disclosure may include the number of times of changing the at least one first setting and the changing time by the user. In detail, when the user changes at least on setting, the processor 220 of the electronic device 200 may update the change history of the at least one first setting, and the electronic device 200 may determine whether to update the first operation mode based on the change history of the at least one first setting.

As the change of the at least one first setting according to an embodiment of the disclosure is sensed, the electronic device 200 may determine whether to update the setting information about the at least one first setting in operations S730 and S740 in an example of determining whether to update the setting information about the at least one first setting based on at least one of the changing pattern of the at least one first setting or the change history of the user with respect to the at least one first setting.

In operation S730, the electronic device 200 according to an embodiment of the disclosure may determine whether the change of the at least one first setting satisfies a critical value for the update.

In an embodiment of the disclosure in which it is determined whether the change of the at least one first setting satisfies the critical value for the update, the electronic device 200 may identify the change of the at least one first setting is within the critical value of the preset time (with respect to the update) based on the changing pattern of the at least one first setting.

For example, when the at least one first setting is changed within 10 minutes after starting the first operation mode, the electronic device 200 may identify whether the at least one first setting is changed within 10 minutes that is the preset time period. The operation of determining whether the change of the at least one first setting is within the critical value, that is, the preset time period for the update will be described in detail later with reference to FIGS. 8 and 9.

The electronic device 200 according to an embodiment of the disclosure may identify whether the number of times of changing the at least one first setting exceeds a preset critical value based on the change of the at least one first setting and the change history of the user with respect to the at least one first setting, in an embodiment of the disclosure in which it is determined whether the change of the at least one first setting satisfies the critical value for the update. The operation of identifying whether the number of times of changing the at least one first setting exceeds the preset critical value based on the change of at least one first setting and the change history of the user with respect to the at least one first setting will be described later with reference to FIG. 10.

The electronic device 200 according to an embodiment of the disclosure may update the plurality of settings corresponding to the first operation mode in operation S740, when the change of the at least one first setting satisfies the critical value for the update. Also, when the change of the at least one first setting does not satisfy the critical value for the update, the electronic device 200 may not update the plurality of settings. Therefore, when the operation mode of the electronic device 200 is identified as the first operation mode, the electronic device 200 may provide the first operation mode with the plurality of settings that are not updated.

In operation S740, the electronic device 200 according to an embodiment of the disclosure may update the plurality of settings corresponding to the first operation mode of the electronic device 200 according to whether to satisfy the condition of operation S730.

When the change of the at least one first setting satisfies the critical value for the update, the electronic device 200 according to an embodiment of the disclosure may update the plurality of settings corresponding to the first operation mode. Therefore, when the operation mode of the electronic device 200 is identified as the first operation mode, the electronic device 200 may provide the first operation mode with the plurality of settings that are updated. Here, the updated plurality of settings may denote that the at least one first setting of which the change is sensed is updated.

The operation of updating the operation mode through the change of at least one first setting as shown in FIG. 7 may be continuously performed as the setting change by the user is sensed.

Figure 8:
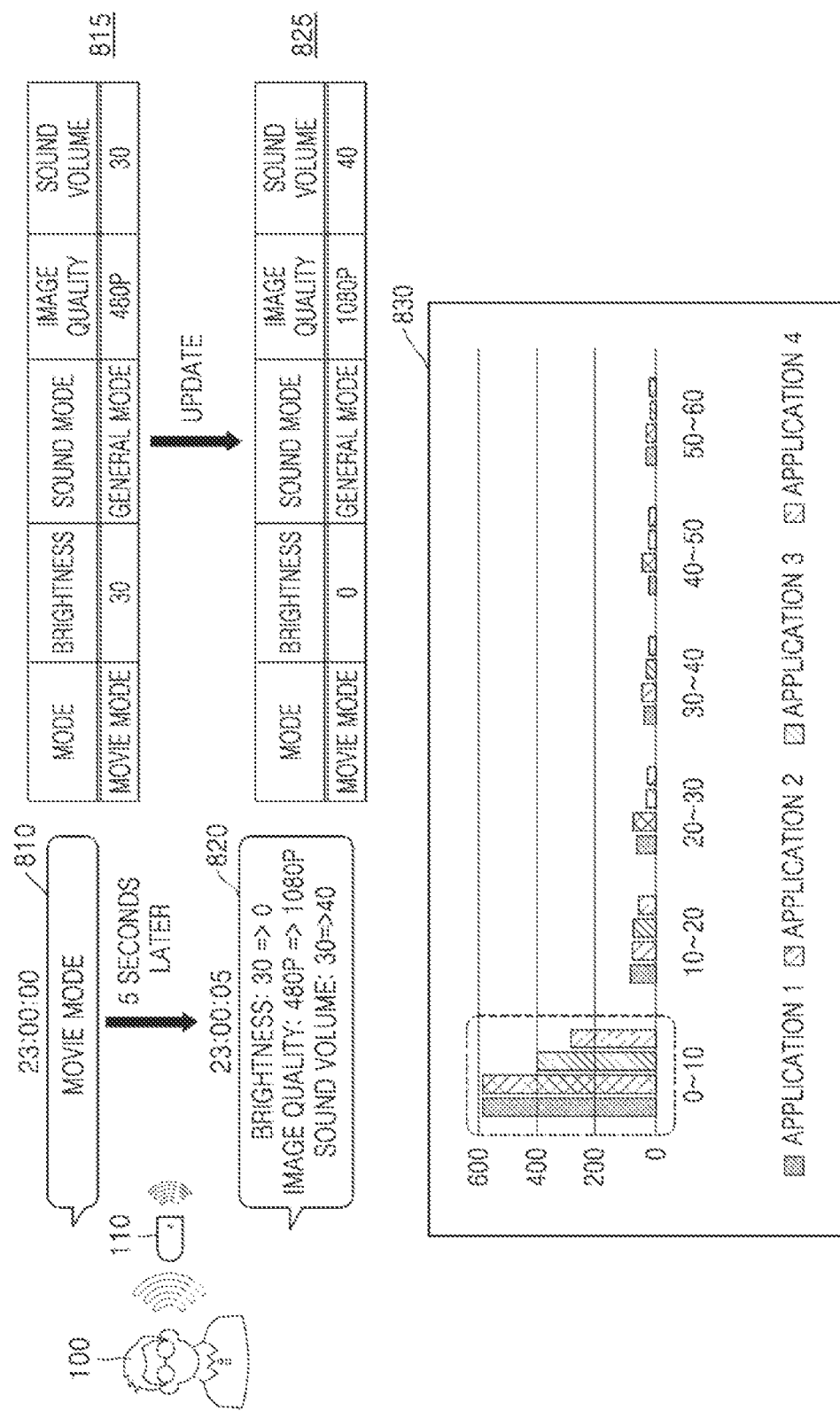
FIG. 8 is a diagram illustrating a method of updating setting information with respect to at least one first setting, when a change of at least one first setting corresponds to the change pattern with respect to at least one first setting, according to an embodiment of the disclosure.

FIG. 8 is a diagram illustrating a method of updating setting information with respect to at least one first setting, when a change of at least one first setting corresponds to the change pattern with respect to at least one first setting according to an embodiment of the disclosure.

Referring to FIG. 8, in an embodiment of the disclosure in which it is determined whether the change of the at least one first setting satisfies the critical value for the update, the electronic device 200 of an embodiment of the disclosure may update the setting information about the at least one first setting when the change of the at least one first setting corresponds to the changing pattern of the at least one first setting. In detail, the electronic device 200 may determine whether to update the setting information of the at least one first setting according to whether the change of the at least one first setting is within the critical value, that is, the preset time period, based on the changing pattern of the at least one first setting.

Referring to at least one first setting changing pattern 830 according to an embodiment of the disclosure, the plurality of users using the first operation mode mainly change the plurality of settings corresponding to the first operation mode in 0 to 10 minutes after the electronic device 200 starts to operate in the first operation mode.

Therefore, when the change of at least one first setting occurs after 10 minutes, the electronic device 200 may determine that the change of the at least one first setting is irrelevant with the update of the first operation mode. For example, the user may reduce the sound volume after one hour from the movie mode, for receiving a phone call. Here, the change in the sound volume may correspond to the change of at least one first setting, which is irrelevant with the update of the first operation mode. On the contrary, when the change of at least one first setting occurs within 10 minutes, the electronic device 200 may identify that the change of the at least one first setting is relevant with the update of the first operation mode.

The electronic device 200 according to an embodiment of the disclosure may receive an input from the user 100, that is, a movie mode 810, via the remote control device 110. When the electronic device 200 receives the movie mode 810 that is the input from the user 100 at 23:00:00, a current operating status 815 of the electronic device 200 may correspond to, from among the plurality of settings, the brightness of 30, the sound mode of the general mode, the image quality of 480P, and the sound volume of 30.

The electronic device 200 according to an embodiment of the disclosure may sense a change 820 in at least one of the plurality of settings corresponding to the movie mode 810 that is the first operation mode. The user may input the movie mode 810, that is, the input about the operation, and may input the change 820 of at least one first setting into the electronic device 200. For example, the user 100 may input the change of the at least one first setting at 5 seconds, that is, 23:00:05, after inputting the movie mode 810 that is the input from the user 100. Accordingly, the electronic device 200 may sense the change 820 of the at least one first setting, including the adjustment of the brightness from 30 to 0, the image quality of 480P to 1080P, and the sound volume from 30 to 40.

The electronic device 200 according to an embodiment of the disclosure may determine whether to update setting information about at least one first setting, according to the change 820 of the at least one first setting. For example, because the change 820 of the at least one first setting is sensed at 23:00:05 that is 5 seconds after the input of the user 100, the electronic device 200 may determine that the change 820 of the at least one first setting occurs within the critical value, that is, the preset time period. The critical value of the preset time period may be determined based on the changing pattern 830 of the at least one first setting, and the critical value of the preset time period may be 10 minutes.

The electronic device 200 according to an embodiment of the disclosure may update the setting information about the at least one first setting, when the change 820 of at least one first setting corresponds to the changing pattern with respect to the at least one first setting. Therefore, the electronic device 200 may optimize the at least one first setting for the user 100, and may generate a first operation mode 825 that is updated. The updated first operation mode 825 may be an operation mode in which the brightness, the image quality, and the sound volume are optimized for the user.

Figure 9:
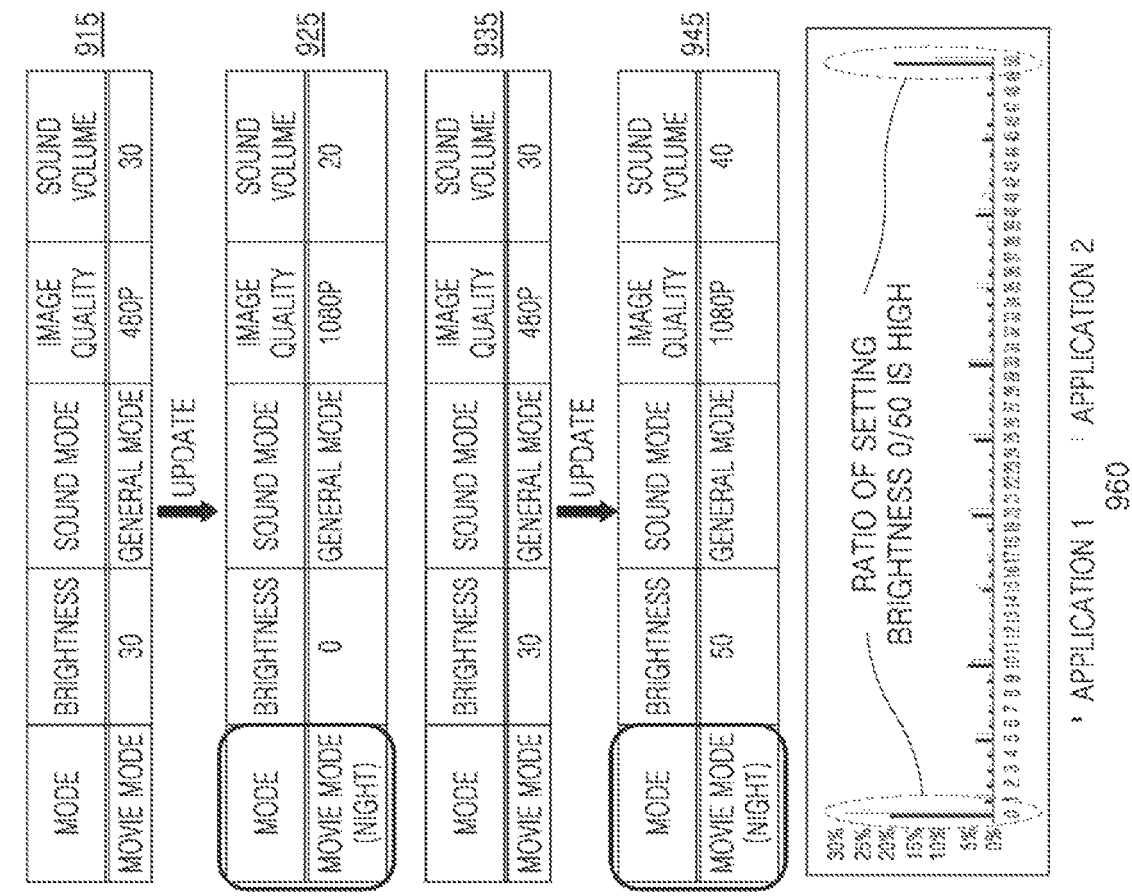
FIG. 9 is a diagram illustrating a method of updating setting information with respect to at least one first setting, when a change of at least one first setting corresponds to the change pattern with respect to at least one first setting, according to an embodiment of the disclosure.

FIG. 9 is a diagram illustrating a method of updating setting information with respect to at least one first setting, when a change of at least one first setting corresponds to the change pattern with respect to at least one first setting according to an embodiment of the disclosure.

Referring to FIG. 9, in an embodiment of the disclosure in which it is determined whether the change of the at least one first setting satisfies the critical value for the update, the electronic device 200 of an embodiment of the disclosure may update the setting information about the at least one first setting when the change of the at least one first setting corresponds to the changing pattern of the at least one first setting. The changing pattern of the at least one first setting according to an embodiment of the disclosure may include a pattern of changing the plurality of settings at a certain time or with a certain interval, when the electronic device 200 operates in the first operation mode. Also, the electronic device 200 may update the first operation mode having a plurality of set values that are different at certain times. For example, the electronic device 200 may update a movie mode in daytime and a movie time in night time in parallel, with respect to one operation, that is, the movie mode.

Referring to a changing pattern 950 of at least one first setting according to an embodiment of the disclosure, a plurality of users using the first operation mode mainly change at least one first setting from 8 pm to 1 am. Also, referring to a change 960 with respect to the brightness in the at least one first setting, the plurality of users mainly set the brightness of the display 241 of the electronic device 200 to be 0 (minimum) or 50 (maximum). Therefore, when the change of the at least one first setting matches to the changing pattern 950 of the at least one pattern or the change 960 with respect to the brightness in the at least one first setting, the electronic device 200 may update the plurality of setting of the first operating mode.

The electronic device 200 according to an embodiment of the disclosure may receive an input from a user 100, that is, a movie mode 910, via a remote control device 110. When the electronic device 200 receives the movie mode 910 that is the input from the user 100 at 23:00:00, a current operating status 915 of the electronic device 200 may correspond to, from among the plurality of settings, the brightness of 30, the sound mode of the general mode, the image quality of 480P, and the sound volume of 30.

The electronic device 200 according to an embodiment of the disclosure may sense a change 920 in at least one of the plurality of settings corresponding to the movie mode 910 that is the first operation mode. The user may input the movie mode 910, that is, the input about the operation, and may input the change 920 of at least one first setting into the electronic device 200. For example, the user 100 may input the change of the at least one first setting at one minute, that is, 23:01:00, after inputting the movie mode 910 that is the input from the user 100. Accordingly, the electronic device 200 may sense the change 920 of the at least one first setting, including the adjustment of the brightness from 30 to 0, the image quality of 480P to 1080P, and the sound volume from 30 to 20.

When the change 920 of the at least one first setting matches to the changing pattern 950 of the at least one pattern or the change 960 of the brightness in the at least one first setting, the electronic device 200 according to an embodiment of the disclosure may update the plurality of settings of the first operation mode. For example, referring to FIG. 9, the electronic device 200 may sense the change 920 of the at least one first setting at 11:01:00 μm, and may determine that the change 920 of the at least one first setting occurs between 8 pm to 1 am, that is, correspond to the changing pattern 950 of the at least one first setting. Also, the change 920 of the at least one first setting includes the changing of the brightness from 30 to 0, and thus, the electronic device 200 may determine that the change 920 of the at least one first setting matches to the change 960 of the brightness in the at least one first setting.

Therefore, the electronic device 200 may generate an updated first operation mode 925 by changing the at least one first setting. When the operation mode of the electronic device 200 is identified as the first operation mode later between 8 pm and 1 am, the electronic device 200 may provide the user 100 with the updated first operation mode 925.

The electronic device 200 according to an embodiment of the disclosure may receive an input from a user 100, that is, a movie mode 930, via a remote control device 110. When the electronic device 200 receives the movie mode 930 that is the input from the user 100 at 12:00:00, a current operating status 935 of the electronic device 200 may correspond to, from among the plurality of settings, the brightness of 30, the sound mode of the general mode, the image quality of 480P, and the sound volume of 30. Here, the time when the operation mode of the electronic device 200 is identified as the first operation mode is 12:01 μm and does not correspond to the changing pattern 950 with respect to the at least one first setting, and thus, the electronic device 200 may provide the user 100 with the first operation mode with the plurality of settings that are not updated.

The electronic device 200 according to an embodiment of the disclosure may sense a change 940 in at least one of the plurality of settings corresponding to the movie mode 930 that is the first operation mode. The user may input the movie mode 930, that is, the input about the operation, and may input the change 940 of at least one first setting into the electronic device 200. For example, the user 100 may input the change of the at least one first setting at one minute, that is, 12:01:00, after inputting the movie mode 930 that is the input from the user 100. Accordingly, the electronic device 200 may sense the change (940) of the at least one first setting, including the adjustment of the brightness from 30 to 50, the image quality of 480P to 1080P, and the sound volume from 30 to 40.

When the change 940 of the at least one first setting matches to the changing pattern 950 of the at least one pattern or the change 960 of the brightness in the at least one first setting, the electronic device 200 according to an embodiment of the disclosure may update the plurality of settings of the first operation mode. For example, referring to FIG. 9, because the change 920 of the at least one first setting is sensed at 12:01:00 μm, the electronic device 200 may identify that the change 920 of the at least one first setting does not correspond to the changing pattern 950 of the at least one first setting. Therefore, the electronic device 200 may not update the setting information about the at least one first setting.

Referring to FIG. 5, the user 100 may change the at least one first setting five times, which exceeds the preset number of times of changing the at least one first setting. Here, the electronic device 200 according to an embodiment of the disclosure may update the setting information about the at least one first setting in consideration of the change history of the user 100 with respect to the at least one first setting. Therefore, the electronic device 200 may generate an updated first operation mode 945 by changing the at least one first setting. When the operation mode of the electronic device 200 is identified as the first operation mode later at the other times than between 8 pm and 1 am, the electronic device 200 may provide the user 100 with the updated first operation mode 945.

Figure 10:
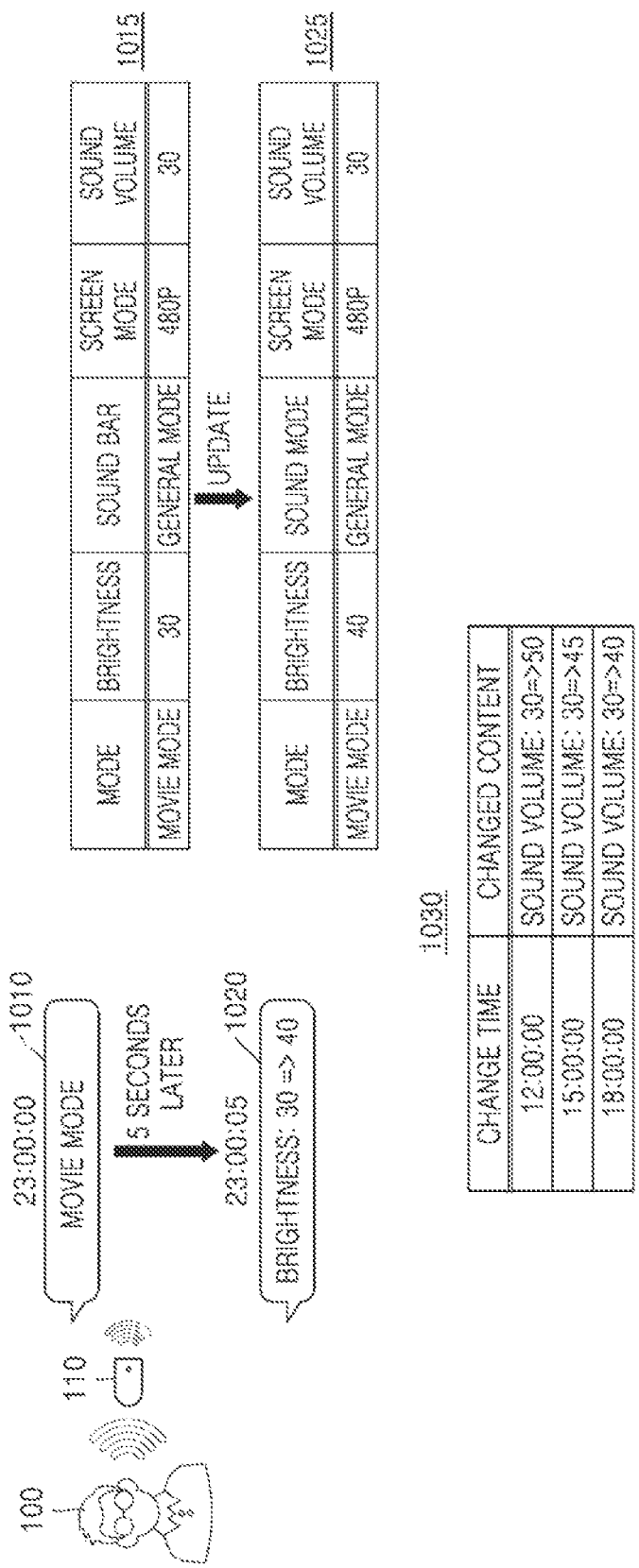
FIG. 10 is a diagram illustrating a method of updating setting information with respect to at least one first setting, based on a change of at least one first setting and change history of the user with respect to at least one first setting, according to an embodiment of the disclosure.

FIG. 10 is a diagram illustrating a method of updating setting information with respect to at least one first setting, based on a change of at least one first setting and change history of the user with respect to at least one first setting according to an embodiment of the disclosure.

Referring to FIG. 10, the electronic device 200 may determine whether to update the setting information about the at least one first setting, according to whether the number of times of changing the at least one first setting exceeds a critical value set in advance based on the change of the at least one first setting and the change history of the user with respect to the at least one first setting.

Referring to a change history 1030 of the user 100 with respect to the at least one first setting according to an embodiment of the disclosure, the change history 1030 of the user 100 with respect to the at least one first setting may include at least one of a changing time of the user 100 with respect to the at least one first setting or change content of the user 100 with respect to the at least one first setting. For example, referring to FIG. 10, the change history 1030 of the user 100 with respect to the at least one first setting may include at least one of information indicating the change of the at least one first setting is carried out at 12 pm, 15 μm, and 19 pm, or information indicating that the change of the at least one first setting is about changing the sound volume of the content that is being played.

The electronic device 200 according to an embodiment of the disclosure may receive an input from a user 100, that is, a movie mode 1010, via a remote control device 110. When the electronic device 200 receives the movie mode 1010 that is the input from the user 100 at 23:00:00, a current operating status 1015 of the electronic device 200 may correspond to, from among the plurality of settings, the brightness of 30, the sound mode of the general mode, the image quality of 480P, and the sound volume of 30.

The electronic device 200 according to an embodiment of the disclosure may sense a change 1020 in at least one of the plurality of settings corresponding to the movie mode 1010 that is the first operation mode. The user may input the movie mode 1010, that is, the input about the operation, and may input the change 1020 of at least one first setting into the electronic device 200. For example, the user 100 may change the at least one first setting at one minute, that is, 23:01:00, after inputting the movie mode 1010 that is the input from the user 100. Accordingly, the electronic device 200 may sense the change 1020 of the at least one first setting including the change of the brightness from 30 to 40.

The electronic device 200 according to an embodiment of the disclosure may determine whether to update the setting information about the at least one first setting, according to whether the number of times of changing the at least one first setting exceeds a critical value set in advance based on the change 1020 of the at least one first setting and the change history of the user with respect to the at least one first setting. For example, when the number of times of changing the brightness, that is, the at least one first setting, exceeds the critical value set in advance, e.g., 10 times, the electronic device 200 may update the setting information about the at least one first setting. Therefore, the electronic device 200 may generate an updated first operation mode 1025 in which the brightness, that is, the at least one first setting, is changed from 30 to 40.

Therefore, when the operation mode of the electronic device 200 is identified later as the first operation mode, e.g., the movie mode, the electronic device 200 may provide the updated first operation mode 1025 including the changed at least one first setting to the user 100.

Figure 11:
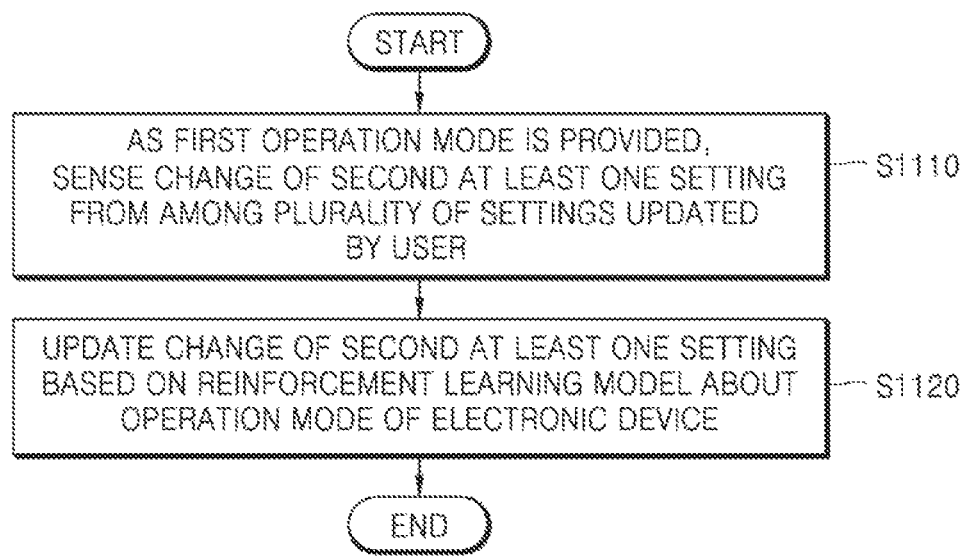
FIG. 11 is a flowchart for determining whether to update setting information of at least one first setting, based on an enhanced learning model with respect to an operation mode of an electronic device, according to an embodiment of the disclosure.

FIG. 11 is a flowchart for determining whether to update setting information of at least one first setting, based on enhanced learning model with respect to an operation mode of an electronic device according to an embodiment of the disclosure.

In operation S1110, as the electronic device 200 according to an embodiment of the disclosure provides the first operation mode, the electronic device 200 may sense a change in at least one second setting from among the plurality of settings updated by the user.

The electronic device 200 according to an embodiment of the disclosure may sense the change of the at least one first setting from the user, based on the changing pattern of the at least one first setting and the change history of the user with respect to the at least one first setting. Even when the electronic device provides the updated operation mode, the at least one second setting changed by the user may correspond to a setting that needs to be additionally changed.

In operation S1120, the electronic device 200 may determine whether to update the setting information about the at least one second setting based on the reinforcement learning model about the operation mode of the electronic device 200.

The electronic device 200 according to an embodiment of the disclosure may determine whether to update the setting information about the at least one second setting after learning the reinforcement learning model according to the change of the at least one first setting and the change of the at least one second setting. For example, the at least one second setting of which the change is sensed may be the setting that needs to be additionally corrected, or the setting that is included in the at least one first setting but not included in the at least one second setting may not need to be additionally corrected.

The reinforcement learning model according to an embodiment of the disclosure may be a learning model in which a reward for the at least one second setting sensed by the user is a negative reward. In detail, the reinforcement learning model may be a reinforcement learning model in which the reward for the at least one second setting is a negative reward and a reward for the setting that is included in the plurality of settings but not included in the at least one second setting is 0. Therefore, the electronic device 200 changes the set value of the setting that the user continuously changes and reinforces the set value of the setting that the user does not change, and then, may continuously update the operation mode optimized for the user. However, an embodiment of the disclosure is not limited thereto, and the reinforcement learning model may be a reinforcement learning model in which a reward for the second at least one first setting is 0 (zero) and a reward for the setting that is included in the plurality of settings but not included in the at least one second setting is a positive reward.

Figure 12:
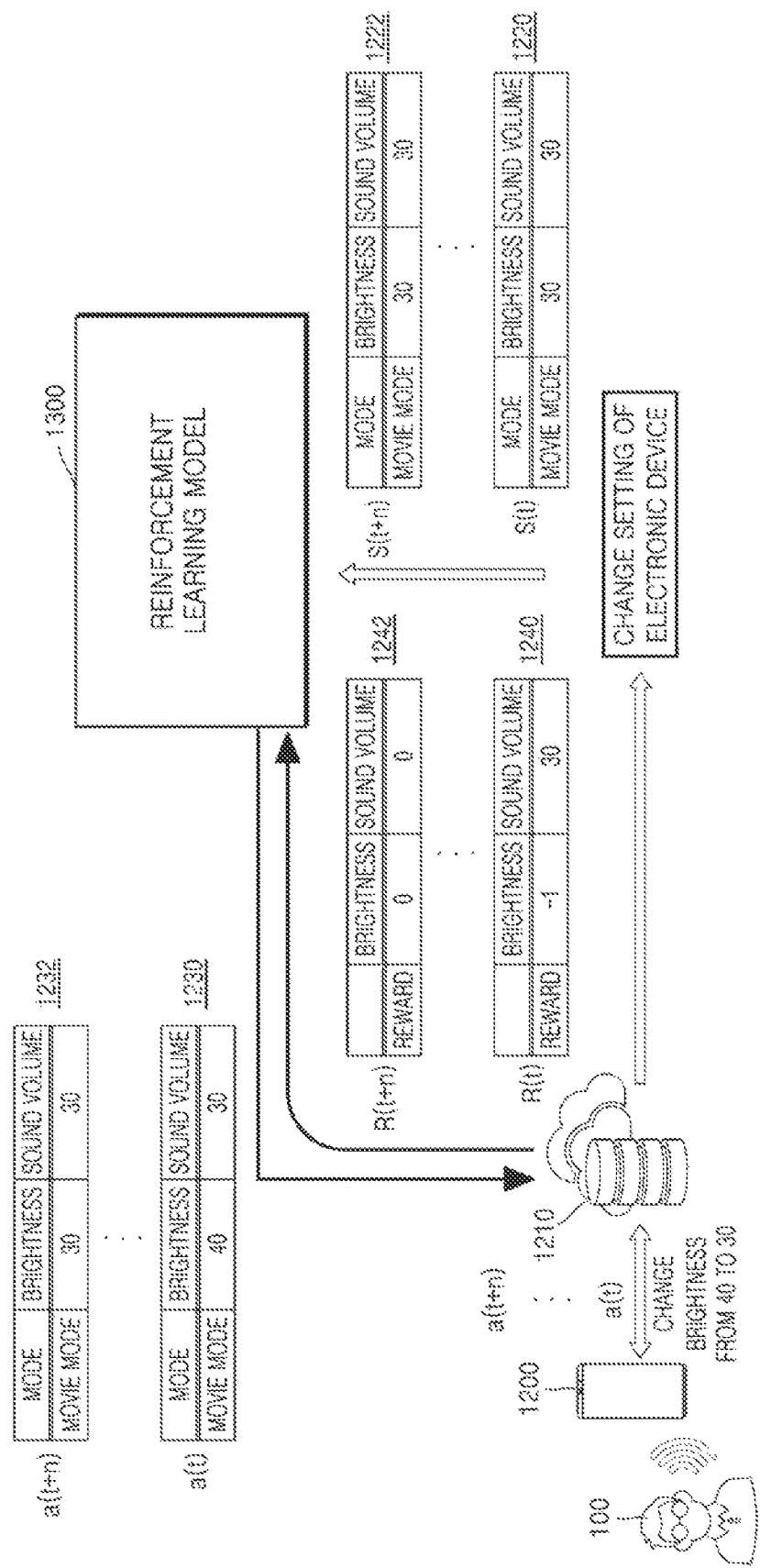
FIG. 12 is a diagram illustrating a method of updating an operation mode based on an enhanced learning model with respect to an operation mode of an electronic device, after sensing a change in at least one first setting from a user, according to an embodiment of the disclosure.

FIG. 12 is a diagram illustrating a method of updating an operation mode based on enhanced learning model with respect to an operation mode of an electronic device, after sensing a change in at least one first setting from a user according to an embodiment of the disclosure.

Referring to FIG. 12, the electronic device 200 according to an embodiment of the disclosure senses the change of the at least one first setting by the user, and may update the first operation mode according to the current operation of the electronic device, based on a reinforcement learning model 1300 about the operation mode of the electronic device.

When the operation mode of the electronic device 200 is identified as the first operation mode at a time t, the electronic device 200 according to an embodiment of the disclosure may provide the user 100 with the first operation including the plurality of settings as a(t) 1230. For example, referring to FIG. 12, a(t) 1230 may denote a current operation state of the electronic device 200, in which the brightness is set as 40 and the sound volume is set as 30 from among the plurality of settings. In the specification of the disclosure, a(x) may denote a current operation state of the electronic device 200 at a time x, and may denote an actual brightness and a sound volume of the content output from the electronic device.

A reinforcement learning model 1300 of the electronic device 200 according to an embodiment of the disclosure may obtain R(t) 1240 from feedback of the user 100 according to a(t−1). R(t) may denote a reward corresponding to the feedback from the user according to a(t) 1230 of the electronic device 200. For example, referring to FIG. 12, R(t) at the time t may be determined according to the feedback from the user 100 at the time t.

In an embodiment of the disclosure for obtaining the feedback from the user 100 at the time t, the user 100 may transmit the feedback to a server 1210 via a portable terminal 1200. The server 1210 transmits the feedback of the user 100 at the time t and R(t) according to the feedback from the user 100 at the time t to the electronic device 200, and the electronic device 200 may determine the R(t) that is the reward for the plurality of settings. For example, because the user 100 inputs the feedback for changing the brightness from 40 to 30, R(t) 1240 may be determined so that the reward for the brightness is −1, that is, negative reward, and the reward for the sound volume is 0. Also, R(t) 1240 may be determined so that the reward for the brightness is 0, that is, the negative reward, and the reward for the sound volume is 1.

The electronic device 200 according to an embodiment of the disclosure may correct the current operation state a(t) 1230 according to the first operation mode to S(t) 1220 by reflecting the feedback from the user 100 at the time t. In the specification, S(t) may denote an operation state changed by the user 100.

The reinforcement learning model 1300 of the electronic device 200 according to an embodiment of the disclosure may determine or learn how to output the first operation mode from the electronic device 200 later, based on S(t) 1220 and R(t) 1240. In detail, the reinforcement learning model 1300 may determine a(t) so that a sum of compensation values of R(t) predicted after the time t may have the maximum value. The reinforcement learning model 1300 may be a policy-based learning model or a model-based learning model, but is not limited thereto. For example, when the reinforcement learning model 1300 is policy-based, the electronic device 200 may randomly determine a set value for a plurality of settings with a certain probability even through a(t) is determined such that the sum of compensation values of the predicted R(t) is the maximum, thereby preventing over-optimization or error generation of the reinforcement learning model. Based on R(t) that is a reward obtained from the feedback of the user 100 and S(t) that is a changed operation state, the reinforcement learning model 1300 may determine and output a(t) that is the operation state of the electronic device 200 when the electronic device 200 operates as the first operation mode, and may be trained to generate the operation mode optimized for the user 100. Accordingly, the electronic device 200 may generate the first operation mode that is optimized for the user 100.

For example, referring to FIG. 12, the reinforcement learning model 1300 may determine a(t+n) 1232 such that the sum of the compensation values of R(t) predicted after a time t+n. Therefore, a(t+n) may indicate an operation state in which the brightness is output as 30, unlike a(t) to a(t+n−1). a(t+n) 1232 may be transmitted to the portable terminal 1200 of the user 100 via the server 1210. The brightness in a(t+n) 1232 is 30 and may be the brightness optimized for the user 100, and thus, the user 100 may transmit to the server 1210 at a time t+n the feedback indicating that the plurality of settings including the brightness are not changed. According to the feedback at the time t+n, the electronic device 200 may obtain, from the server 1210, R(t+n) in which the reward for the brightness is 0 and the reward for the sound volume is 0. Because the plurality of settings in the first operation mode are not required to be changed, S(t+n) at that time may denote the operation state in which the brightness is 30 and the sound volume is 30, that is, the same operation state as a(t+n). Therefore, the reinforcement learning model 1300 of the electronic device 200 may provide the user 100 with the customized operation mode according to the continuous use of the operation mode by the user and the feedback according to the use.

FIG. 13 is a diagram illustrating an example of updating a plurality of settings in a current operation mode of an electronic device based on enhanced learning model with respect to an operation mode of the electronic device, according to an embodiment of the disclosure.

Referring to FIG. 13, the electronic device 200 according to an embodiment of the disclosure may determine whether to update the plurality of settings in the current operation mode of the electronic device, based on the reinforcement learning model. For example, the electronic device 200 may sense the change of the at least one second setting, and may determine whether to update the setting information about the at least one second setting through the reinforcement learning model.

The electronic device 200 according to an embodiment of the disclosure may receive an input from a user 100, that is, a movie mode 1310, via a remote control device 110. When the electronic device 200 receives the movie mode 1310 that is the input from the user 100 at 12:00:00, a current operating status 1315 of the electronic device 200 may correspond to, from among the plurality of settings, the brightness of 30, the sound mode of the general mode, the image quality of 480P, and the sound volume of 30.

The electronic device 200 according to an embodiment of the disclosure may sense a change 1320 in at least one of the plurality of settings corresponding to the movie mode 1310 that is the first operation mode. The user may input the movie mode 1310, that is, the input about the operation, and may input the change 1320 of at least one first setting into the electronic device 200. For example, the user 100 may input the change of the at least one first setting at 5 seconds, that is, 13:00:05, after inputting the movie mode 1310 that is the input from the user 100. Accordingly, the electronic device 200 may sense the change 1320 of the at least one first setting, including the adjustment of the brightness from 30 to 50, the image quality of 480P to 1080P, and the sound volume from 30 to 40.

Accordingly, the electronic device 200 may generate an updated first operation mode 1325 by changing the at least one first setting. In detail, because the at least one first setting is changed within a preset time period, the electronic device 200 may generate updated first operation mode 1325 by changing the at least one first setting.

The electronic device 200 according to an embodiment of the disclosure may receive an input from a user 100, that is, a movie mode 1330, via a remote control device 110. When the electronic device 200 receives the movie mode 1330 that is the input from the user 100, an updated operating status 1335 of the electronic device 200 may correspond to, from among the plurality of settings, the brightness of 50, the sound mode of the general mode, the image quality of 1080P, and the sound volume of 40. The updated operation state 1335 may correspond to set values of the plurality of settings corresponding to the updated first operation mode 1325.

The electronic device 200 according to an embodiment of the disclosure may sense a change 1340 in at least one second setting from among the plurality of settings corresponding to the movie mode 1330 that is the first operation mode. Here, the at least one second setting may be included in the at least one first setting, and may include the brightness and the image quality. The electronic device 200 may sense the change 1320 with respect to the at least one second setting, the change including the adjustment of the brightness from 50 to 45 and the image quality from 1080P to 720P.

According to the change of the at least one second setting, the electronic device 200 may determine whether to update the setting information about the at least one second setting through the reinforcement learning model. For example, a negative reward may be assigned to the brightness and the image quality that are included in the at least one second setting. On the contrary, a zero reward may be assigned to the sound volume that is included in the at least one first setting but not included in the at least one second setting, and then, the reinforcement learning model may be trained. However, an embodiment of the disclosure is not limited thereto, and a zero reward may be assigned to the brightness and the image quality that are included in the at least one second setting. Also, a positive reward may be assigned to the sound volume that is included in the at least one first setting but not included in the at least one second setting, and then, the reinforcement learning model may be trained.

Therefore, the electronic device 200 may reinforce the set value of the sound volume and may change the set values of the brightness and image quality that are included in the at least one second setting. Accordingly, the electronic device 200 may generate a re-updated first operation mode 1345, of which the at least one second setting is changed. The re-updated first operation mode 1345 of the electronic device 200 may correspond to, from among the plurality of settings, the brightness of 45, the sound mode of the general mode, the image quality of 720P, and the sound volume of 40.

The electronic device 200 according to an embodiment of the disclosure may re-receive an input from a user 100, that is, a movie mode 1350, via a remote control device 110. When the electronic device 200 receives the movie mode 1350 that is the input from the user 100, the re-updated operating state 1355 of the electronic device 200 may correspond to, from among the plurality of settings, the brightness of 45, the sound mode of the general mode, the image quality of 720P, and the sound volume of 40. The re-updated operation state 1355 may correspond to set values of the plurality of settings corresponding to the re-updated first operation mode 1345.

The electronic device 200 according to an embodiment of the disclosure may sense a change (1360) in at least one first setting from among the plurality of settings corresponding to the movie mode 1350 that is the first operation mode. Referring to FIG. 13, the at least one first setting may include brightness. The electronic device 200 may sense a change 1320 of the at least one first setting, including the adjustment of the brightness from 45 to 43.

According to the change of the at least one first setting, the electronic device 200 may determine whether to update the setting information about the at least one first setting through the reinforcement learning model. For example, a negative reward may be assigned to the brightness that is the at least one first setting. Also, a zero reward may be assigned to the sound volume that is included in the plurality of settings but not included in the at least one first setting, and then, the reinforcement learning model may be trained. Therefore, the electronic device 200 may reinforce the set values of the sound volume and the image quality, and may change the set value of the brightness included in the at least one first setting. Accordingly, the electronic device 200 may generate the first operation mode in which the at least one first setting is changed. Here, the generated first operation mode may be provided with the plurality of settings, of which the brightness is 43, the sound mode is the general mode, the image quality is 720P, and the sound volume is 40. The electronic device 200 may provide the user 100 with the customized movie mode according to the continuous use of the movie mode by the user and the change of the plurality of settings.

According to an embodiment, the method according to various embodiments disclosed in the present document may be provided to be included in a computer program product. The computer program product may be traded between a seller and a buyer as a product. The computer program product may be distributed in the form of a machine-readable storage medium e.g., compact disc read only memory (CD-ROM)), or be distributed (e.g., downloaded or uploaded) online via an application store, or between two user devices (e.g., smart phones) directly. When distributed online, at least part of the computer program product (e.g., downloadable app) may be temporarily generated or at least temporarily stored in the machine-readable storage medium, such as memory of the manufacturer's server, a server of the application store, or a relay server.

The above description of the disclosure is provided for the purpose of illustration, and it would be understood by those skilled in the art that various changes and modifications may be made without changing technical conception and essential features of the disclosure. Thus, the embodiments of the disclosure set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of an embodiment of the disclosure. It shall be understood that all modifications and embodiments conceived from the meaning and scope of the claims and their equivalents are included in the scope of the disclosure.

The invention claimed is:

1. A method of setting an operation mode of an electronic device, the method comprising:

sensing a change of the operation mode;

identifying the operation mode of the electronic device as a first operation mode from among a plurality of operation modes of the electronic device;

sensing a change of at least one first setting from among a plurality of settings corresponding to the first operation mode;

based on the change of the at least one first setting, determining whether to update setting information about the at least one first setting based on a changing pattern of the at least one first setting; and based on the operation mode of the electronic device being identified as the first operation mode, providing the first operation mode having a plurality of updated settings including the setting information about the updated at least one first setting according to the determination about the updating, wherein the changing pattern of the at least one first setting is a pattern in which, based on the electronic device operating in the first operation mode, the at least one first setting is changed within a preset time period after the operation mode is changed;

based on the at least one first setting being changed within the preset time period, updating the setting information to include the at least one first setting; and based on the at least one first setting being changed after the preset time period has passed, not updating the setting information to include the at least one first setting.

2. The method of claim 1, further comprising, based on the first operation mode being provided, sensing a change of at least one second setting; and determining whether to update setting information about the at least one second setting, based on a reinforcement learning model about the operation mode of the electronic device.

3. The method of claim 2, wherein the reinforcement learning model is a learning model in which a reward for the at least one second setting is a negative reward, and a reward for at least one setting, from among the plurality of settings, not included in the at least one second setting is a zero reward.

4. The method of claim 1, wherein the determining of whether to update the setting information about the at least one first setting comprises:

based on the change of the at least one first setting corresponding to the changing pattern of the at least one first setting, updating the setting information about the at least one first setting.

5. The method of claim 1, wherein the determining of whether to update the setting information about the at least one first setting comprises:

based on the change of the at least one first setting and a change history of a user with respect to the at least one first setting, updating the setting information about the at least one first setting based on a number of times of changing the at least one first setting exceeding a preset value.

6. The method of claim 1, wherein the identifying of the operation mode of the electronic device as the first operation mode from among the plurality of operation modes comprises:

identifying the operation mode of the electronic device as the first operation mode from among the plurality of operation modes, based on status information of the electronic device.

7. The method of claim 6, wherein the status information includes at least one of information about the plurality of settings of the electronic device, information about an application that is being executed on the electronic device, information about content that is being played on the electronic device, or information about an external electronic device connected to the electronic device.

8. The method of claim 1, wherein the identifying of the operation mode of the electronic device as the first operation mode from among the plurality of operation modes comprises:
identifying the operation mode of the electronic device as the first operation mode, based on an input about the operation mode of the electronic device being received from a user.

9. The method of claim 1, wherein the plurality of settings are determined based on a change history of the plurality of settings.

10. An electronic device of which an operation mode is to be set, the electronic device comprising:
a memory storing one or more instructions; and
at least one processor configured to execute the one or more instructions to:
sense a change of the operation mode;
identify the operation mode of the electronic device as a first operation mode from among a plurality of operation modes of the electronic device;
sense a change of at least one first setting from among a plurality of settings corresponding to the first operation mode;
determine whether to update setting information about the at least one first setting, based on a changing pattern of the at least one first setting as the change in the at least one first setting is sensed; and
based on the operation mode of the electronic device being identified as the first operation mode, provide the first operation mode having a plurality of updated settings including the setting information about the updated at least one first setting according to a determination with respect to the updating, wherein the changing pattern of the at least one first setting is a pattern in which, based on the electronic device operating in the first operation mode, the at least one first setting is changed within a preset time period after the operation mode is changed;
based on the at least one first setting being changed within the preset time period, update the setting information to include the at least one first setting; and
based on the at least one first setting being changed after the preset time period has passed, not update the setting information to include the at least one first setting.

11. The electronic device of claim 10, wherein the at least one processor is further configured to, based on the first operation mode being provided, sense a change of at least one second setting, and determine whether to update setting information about the at least one second setting, based on a reinforcement learning model about the operation mode of the electronic device.

12. The electronic device of claim 11, wherein the reinforcement learning model is a learning model in which a reward for the at least one at least one second setting is a negative reward and g, from among the plurality of settings, not included in the at least one second setting is a zero reward.

13. The electronic device of claim 10, wherein the at least one processor is further configured to, based on the change of the at least one first setting corresponding to the changing pattern of the at least one first setting, update setting information about the at least one first setting.

14. The electronic device of claim 10, wherein the at least one processor is further configured to, based on the number of times of changing the at least one first setting exceeding a preset value, update setting information about the at least one first setting, based on the change of the at least one first setting and a change history of a user with respect to the at least one first setting.

15. The electronic device of claim 10, wherein the at least one processor is further configured to identify the operation mode of the electronic device as the first operation mode from among the plurality of operation modes, based on status information of the electronic device.

16. The electronic device of claim 15, wherein the status information includes at least one of information about the plurality of settings of the electronic device, information about an application that is being executed on the electronic device, information about content that is being played on the electronic device, or information about an external electronic device connected to the electronic device.

17. The electronic device of claim 10, wherein the at least one processor is further configured to identify the operation mode of the electronic device as the first operation mode, based on an input about the operation mode of the electronic device being received from a user.

18. A non-transitory computer-readable recording medium having recorded thereon a program, which when executed by a computer, performs a method comprising:
sensing a change of the operation mode;
identifying the operation mode of an electronic device as a first operation mode from among a plurality of operation modes of the electronic device;
sensing a change of at least one first setting from among a plurality of settings corresponding to the first operation mode;
based on the change of the at least one first setting, determining whether to update setting information about the at least one first setting based on a changing pattern of the at least one first setting; and
based on the operation mode of the electronic device being identified as the first operation mode, providing the first operation mode having a plurality of updated settings including the setting information about the updated at least one first setting according to the determination about the updating, wherein the changing pattern of the at least one first setting is a pattern in which, based on the electronic device operating in the first operation mode, the at least one first setting is changed within a preset time period after the operation mode is changed;
based on the at least one first setting being changed within the preset time period, updating the setting information to include the at least one first setting; and
based on the at least one first setting being changed after the preset time period has passed, not updating the setting information to include the at least one first setting.

* * * * *